(12) United States Patent
Thomas et al.

(10) Patent No.: US 7,066,495 B2
(45) Date of Patent: Jun. 27, 2006

(54) EXHAUST BELLOWS FOR DYNAMIC TORSION CONTROL IN AN EXHAUST SYSTEM

(75) Inventors: R. Winfield Thomas, West Lebanon, IN (US); Scott R. Swank, Williamsport, IN (US)

(73) Assignee: Tru-Flex Metal Hose Corp., West Lebanon, IN (US)

( * ) Notice: Subject to any disclaimer, the term of this patent is extended or adjusted under 35 U.S.C. 154(b) by 55 days.

(21) Appl. No.: 10/718,785

(22) Filed: Nov. 21, 2003

(65) Prior Publication Data

US 2004/0100094 A1    May 27, 2004

Related U.S. Application Data

(63) Continuation-in-part of application No. 10/121,628, filed on Apr. 12, 2002.

(60) Provisional application No. 60/318,516, filed on Sep. 10, 2001.

(51) Int. Cl.
*F16L 21/00*    (2006.01)

(52) U.S. Cl. .................... 285/226; 285/903; 285/48

(58) Field of Classification Search ............. 285/121.1, 285/123.17, 48–50, 226, 144.1, 223, 903, 285/229; 138/121
See application file for complete search history.

(56) References Cited

U.S. PATENT DOCUMENTS

| | | | |
|---|---|---|---|
| 1,191,486 A | 7/1916 | Tyler | |
| 2,358,291 A | 9/1944 | Fentress | |
| 2,712,456 A | 7/1955 | McCreery | |
| 5,494,319 A | 2/1996 | Thomas | |
| 5,769,463 A | 6/1998 | Thomas | |
| 5,865,475 A | 2/1999 | Winzen et al. | |
| 5,882,046 A | 3/1999 | Thomas | |
| 6,086,110 A | 7/2000 | Lee et al. | |
| 6,312,023 B1 | 11/2001 | Rattay | |
| 6,315,332 B1 | 11/2001 | Aschoff et al. | |
| 2002/0006491 A1 * | 1/2002 | Ito et al. | .................. 138/137 |

* cited by examiner

*Primary Examiner*—Aaron Dunwoody
(74) *Attorney, Agent, or Firm*—Blackwell Sanders Peper Martin LLP

(57) ABSTRACT

A flexible bellows tube connecting pipes in a system such as a vehicle exhaust system. Various embodiments are disclosed, with each including two conduit sections having mating corrugations that overlap to provide a seal while allowing the two sections to rotate in response to torsion loading. Different configurations of the interfitting corrugations and related structure are disclosed in the different embodiments.

9 Claims, 30 Drawing Sheets

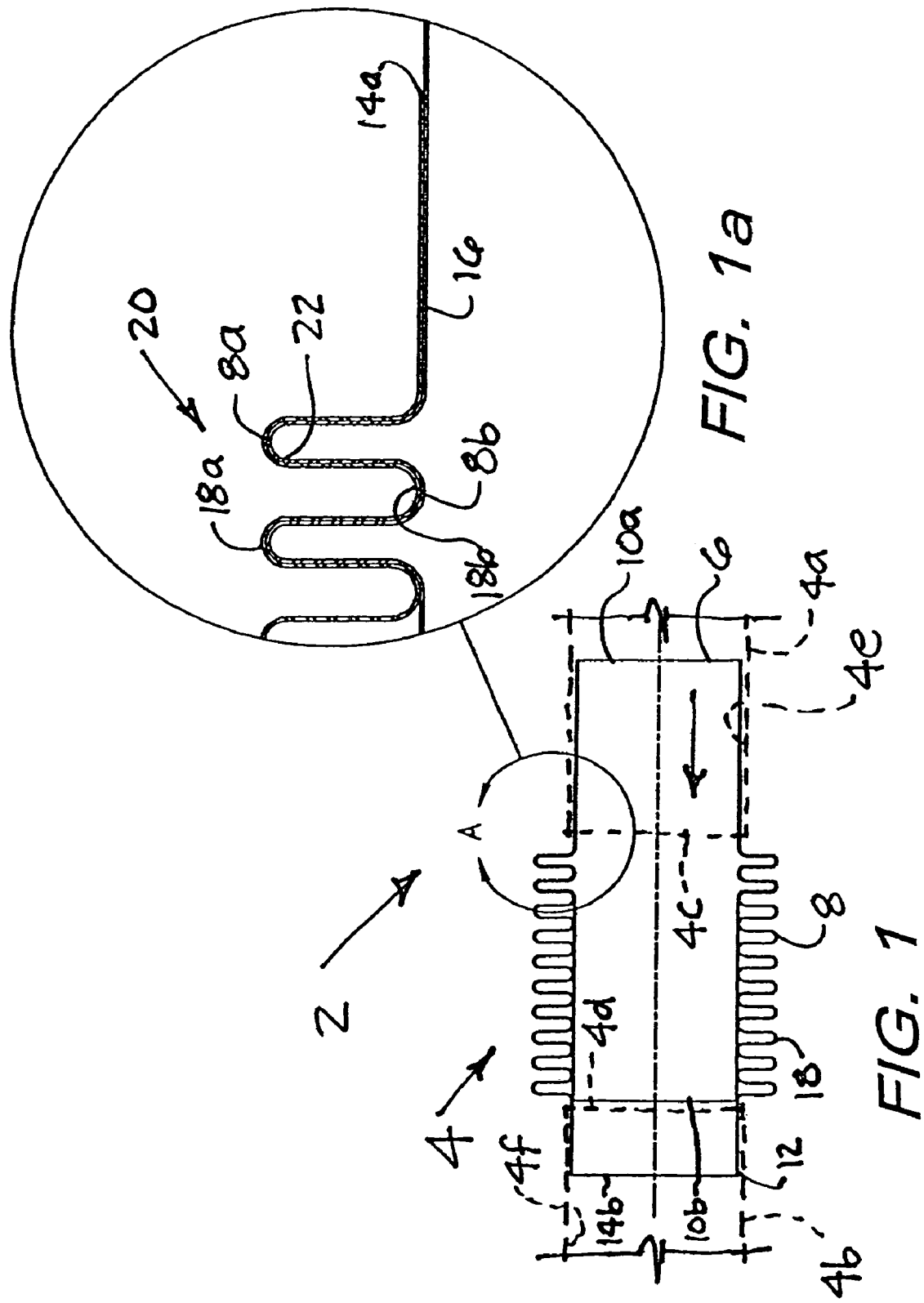

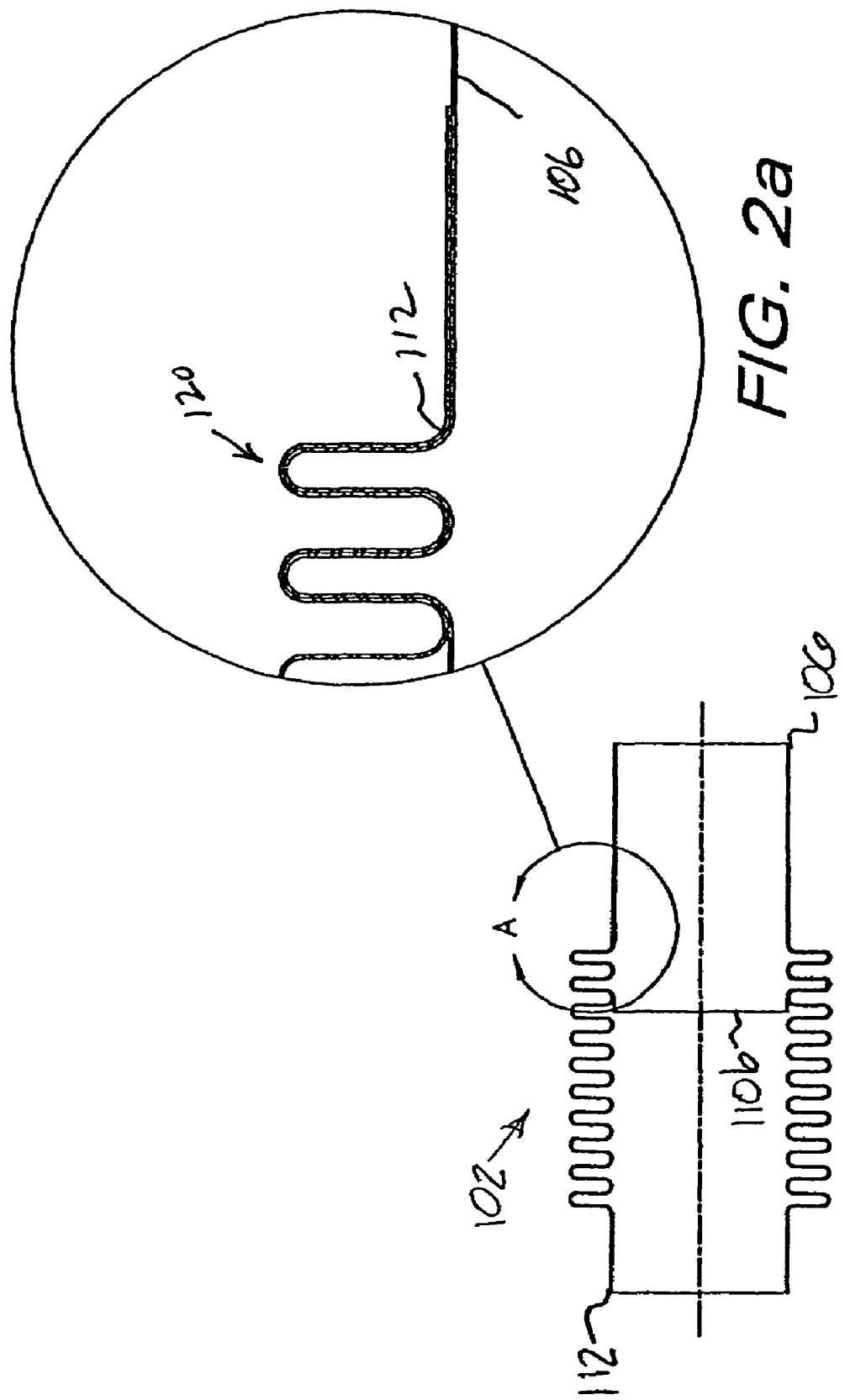

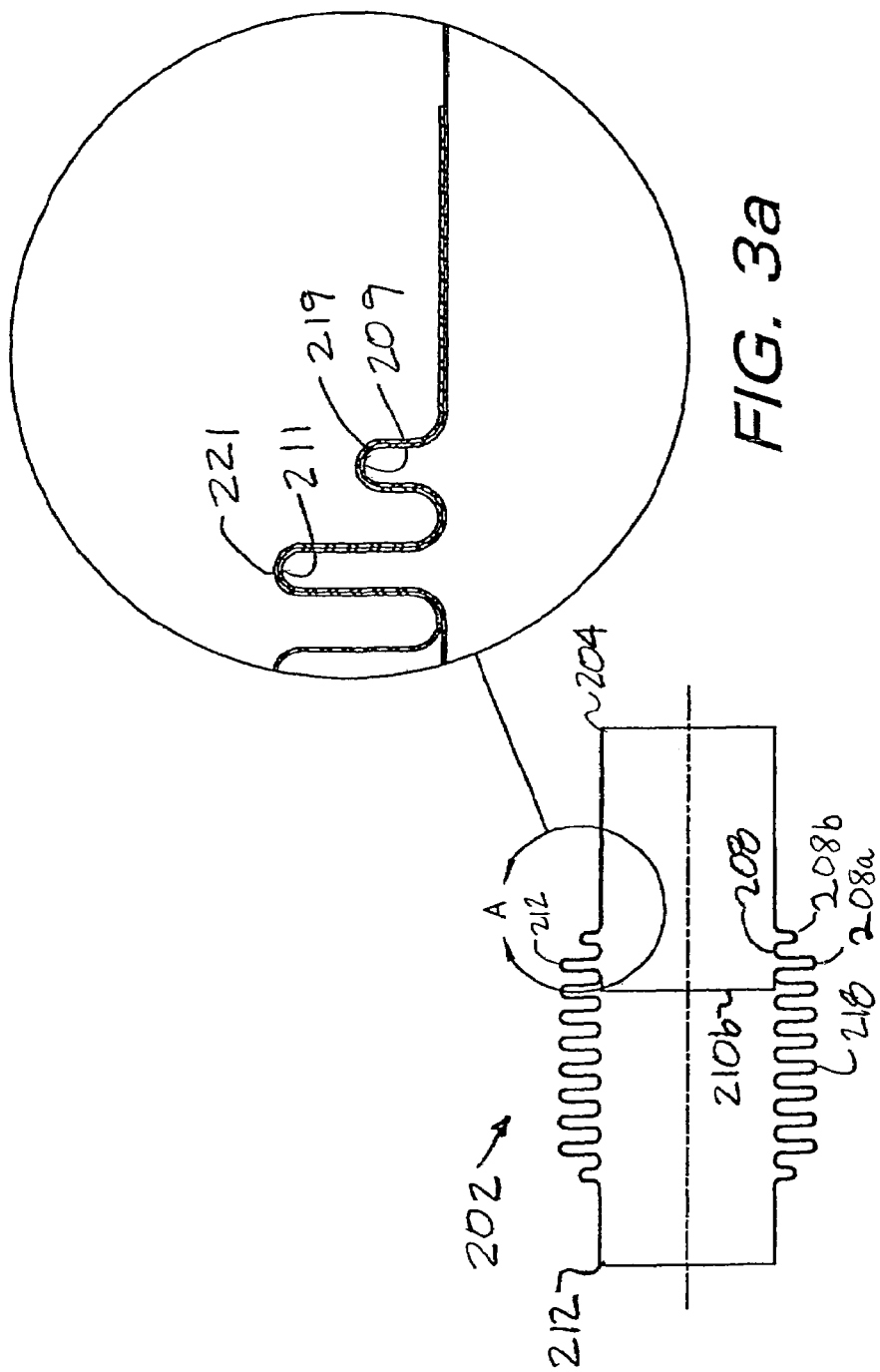

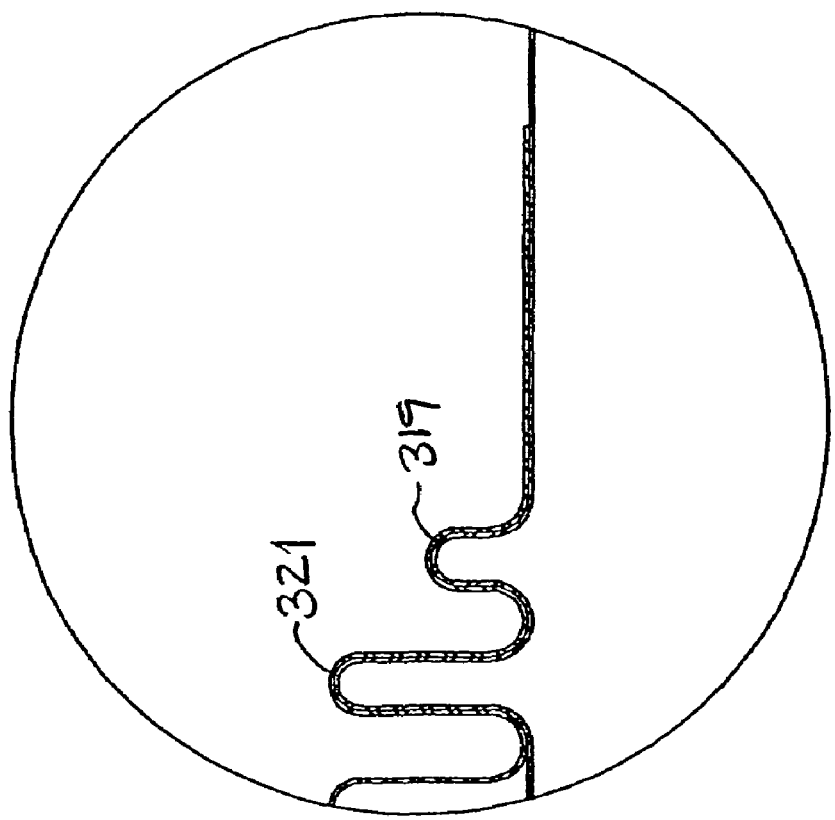
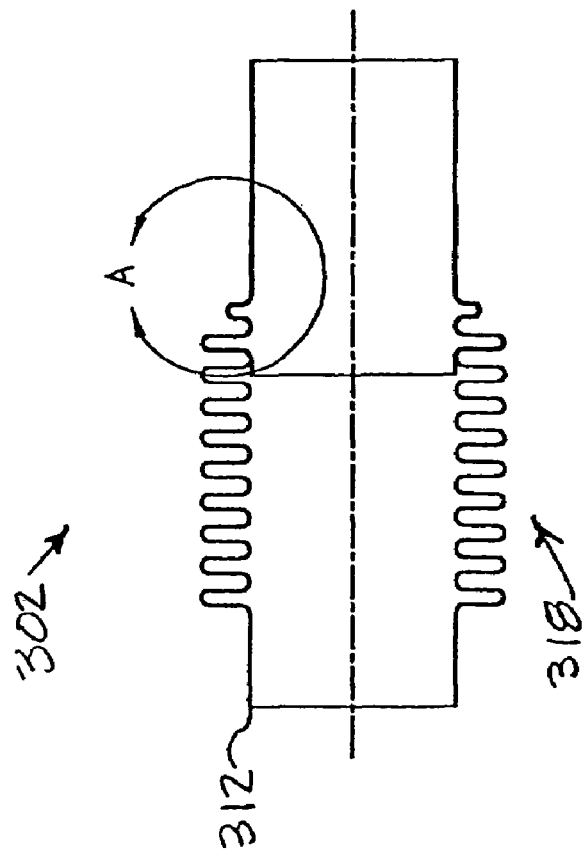
FIG. 4a
FIG. 4

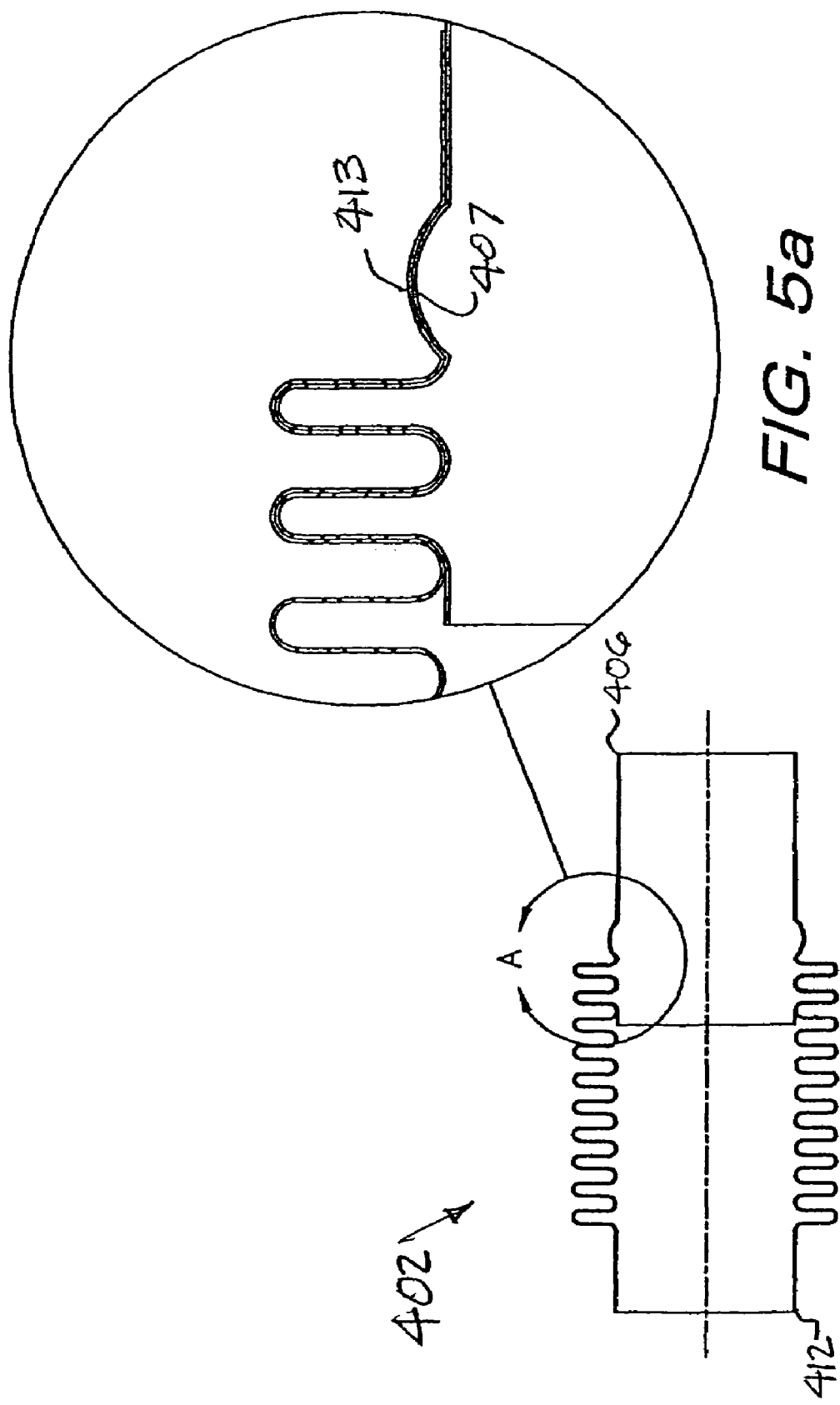

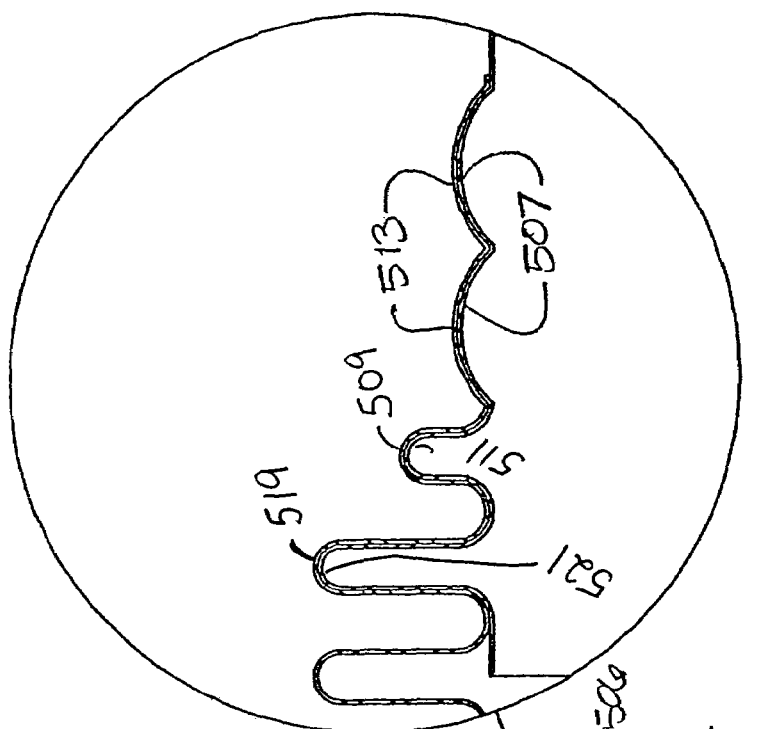
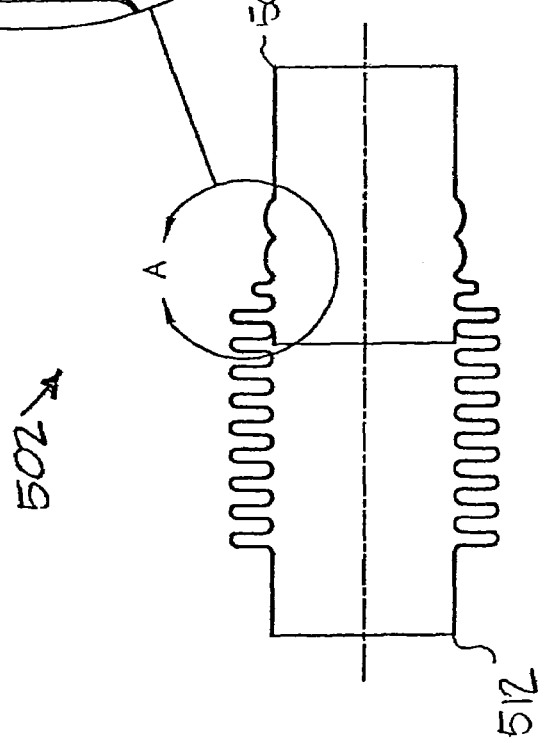
FIG. 6a
FIG. 6

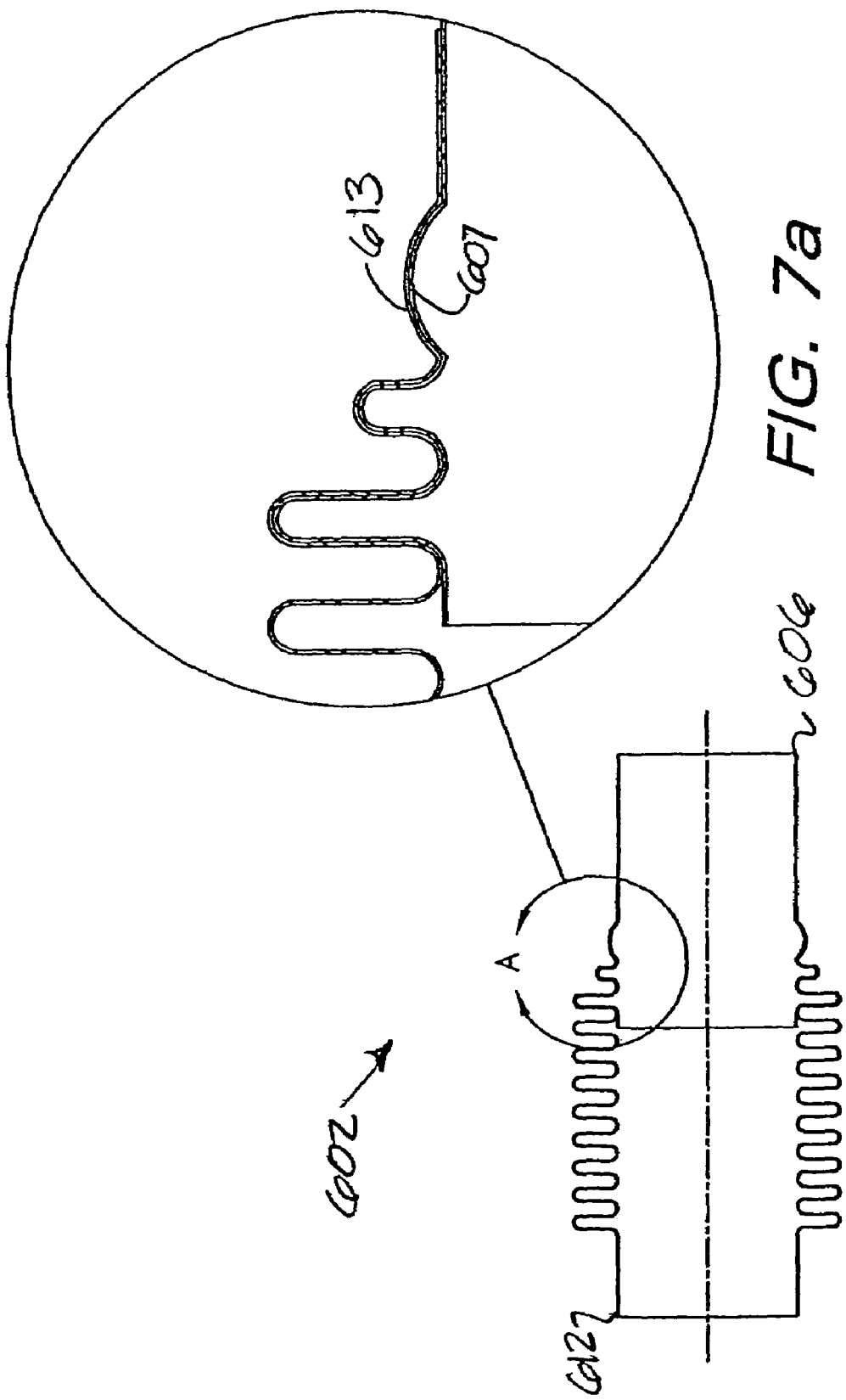

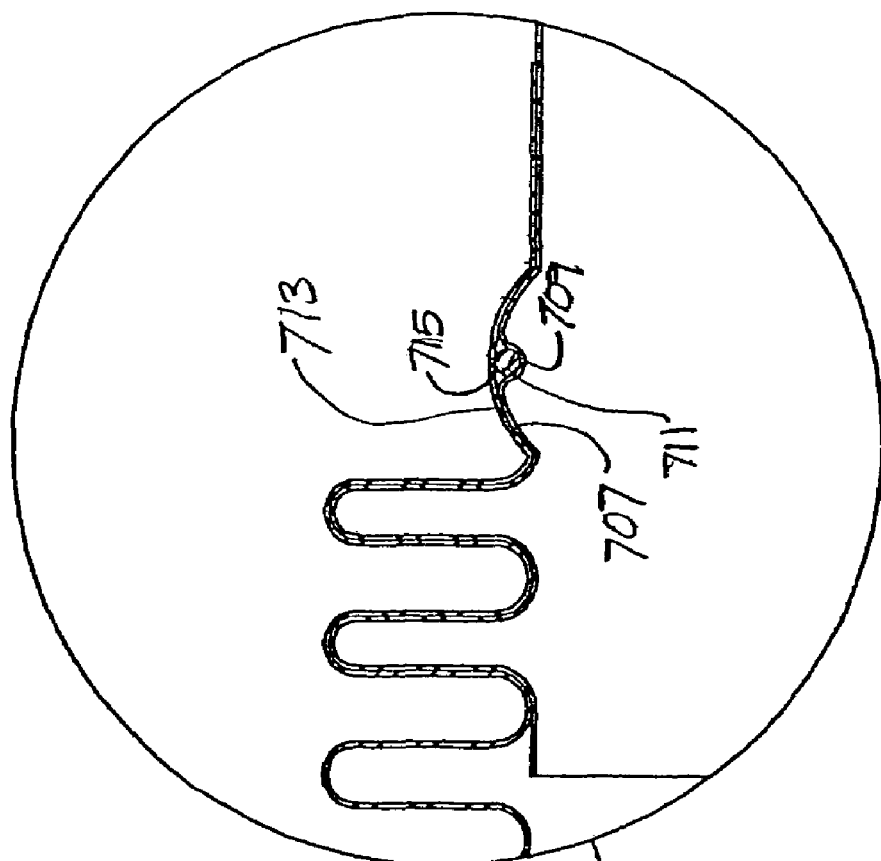
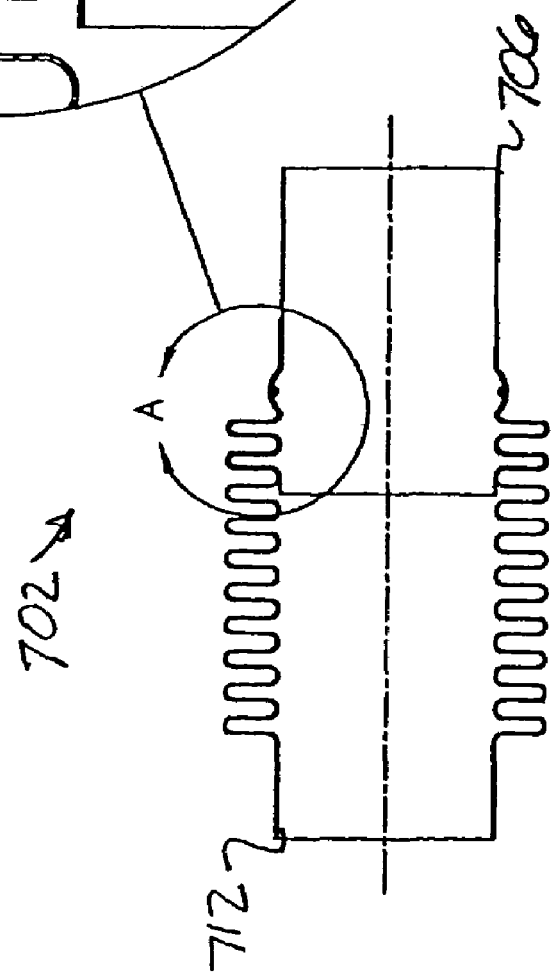
FIG. 8a
FIG. 8

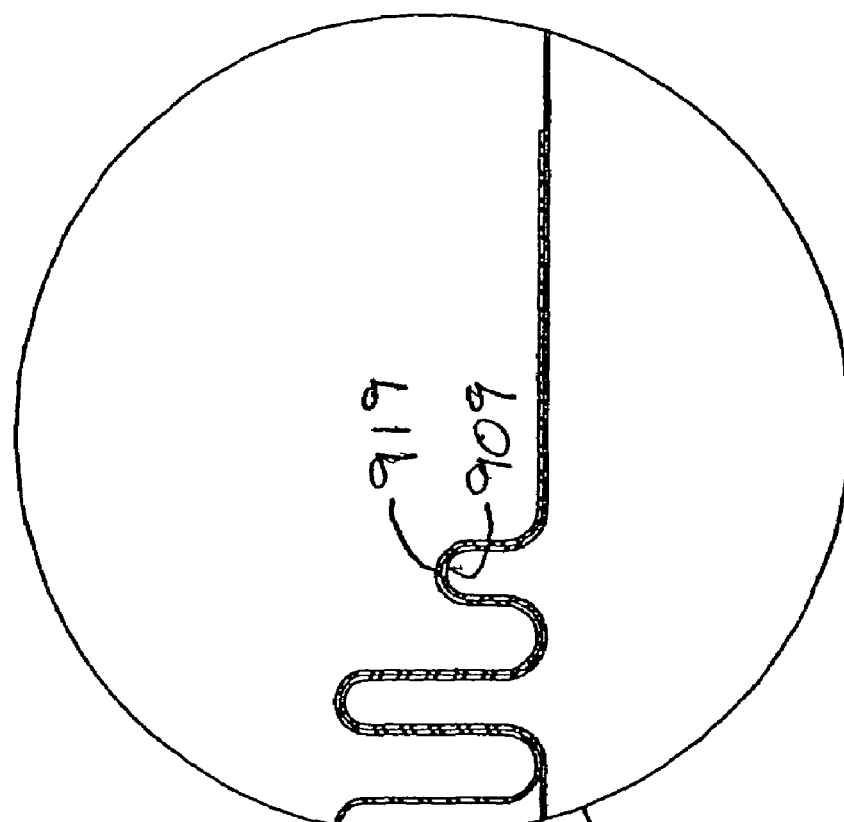
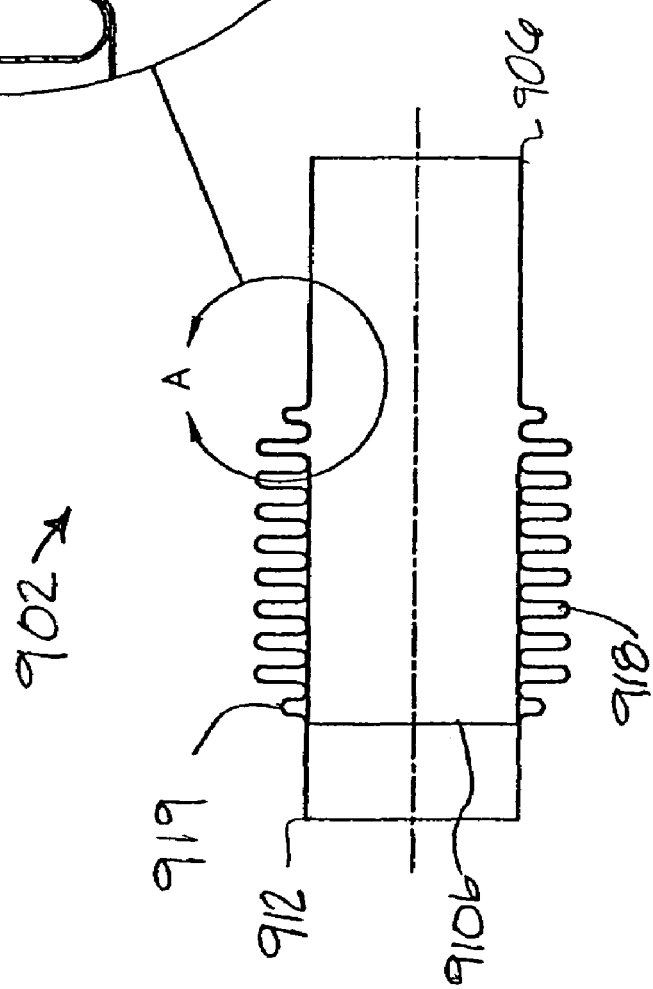
FIG. 10a
FIG. 10

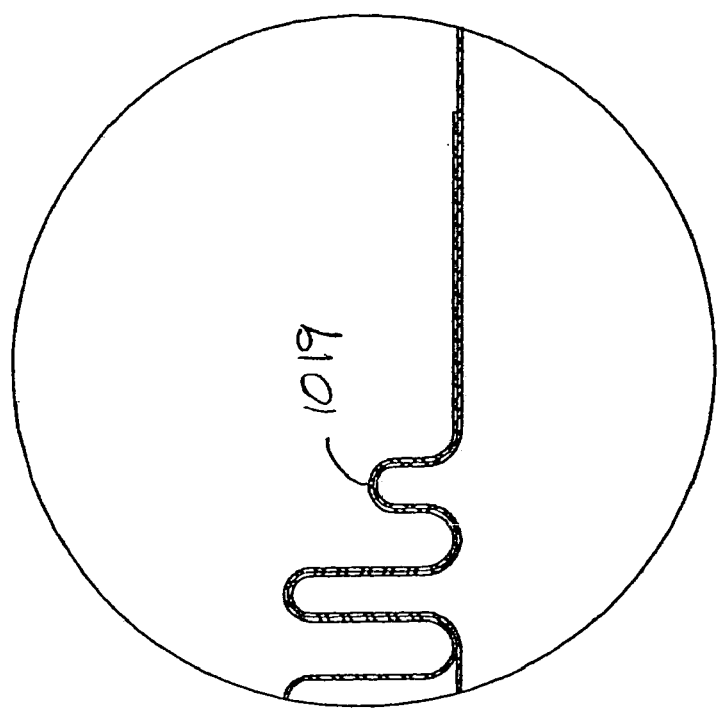
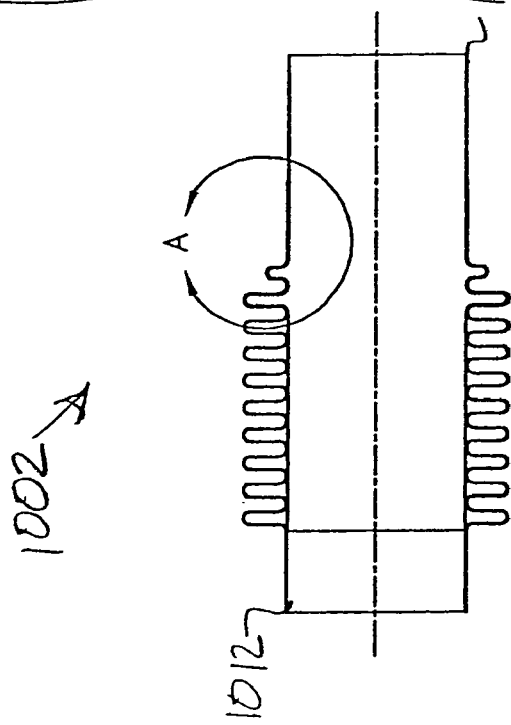
FIG. 11a
FIG. 11

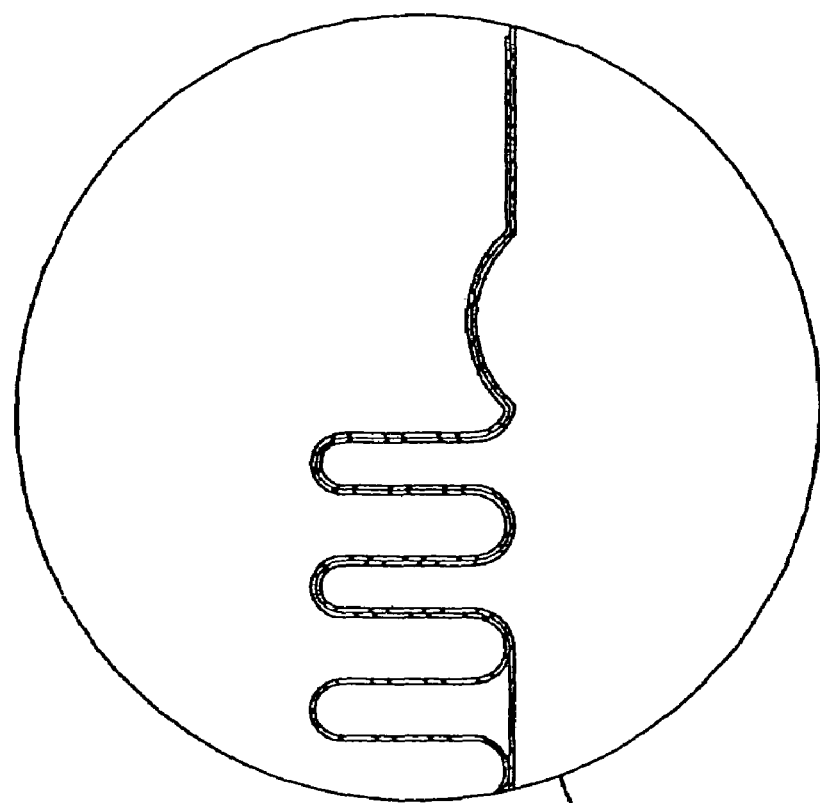
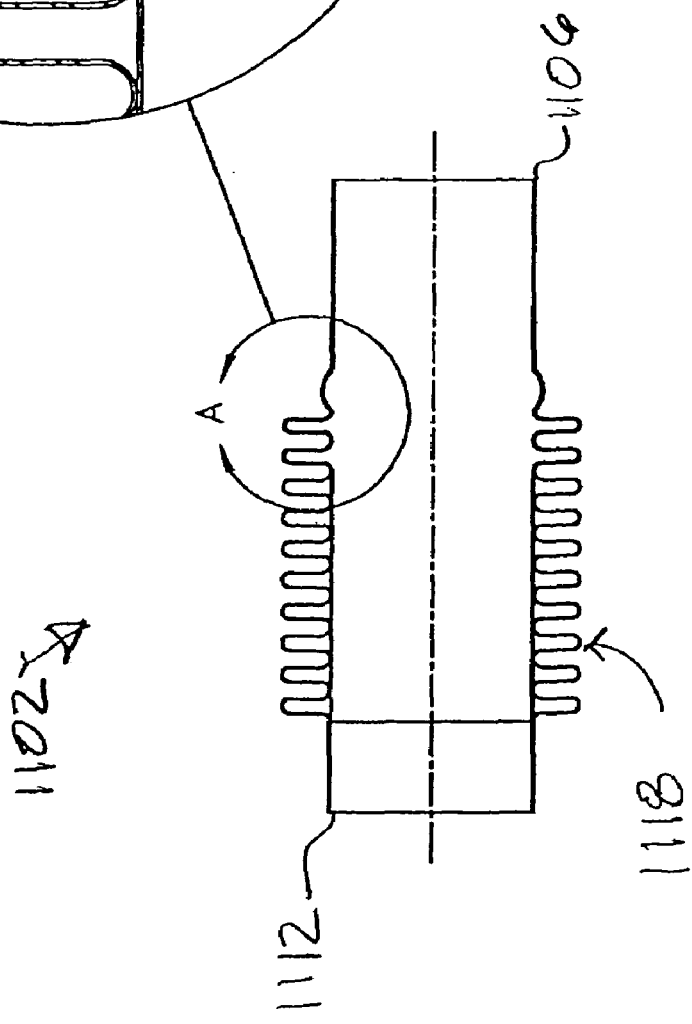

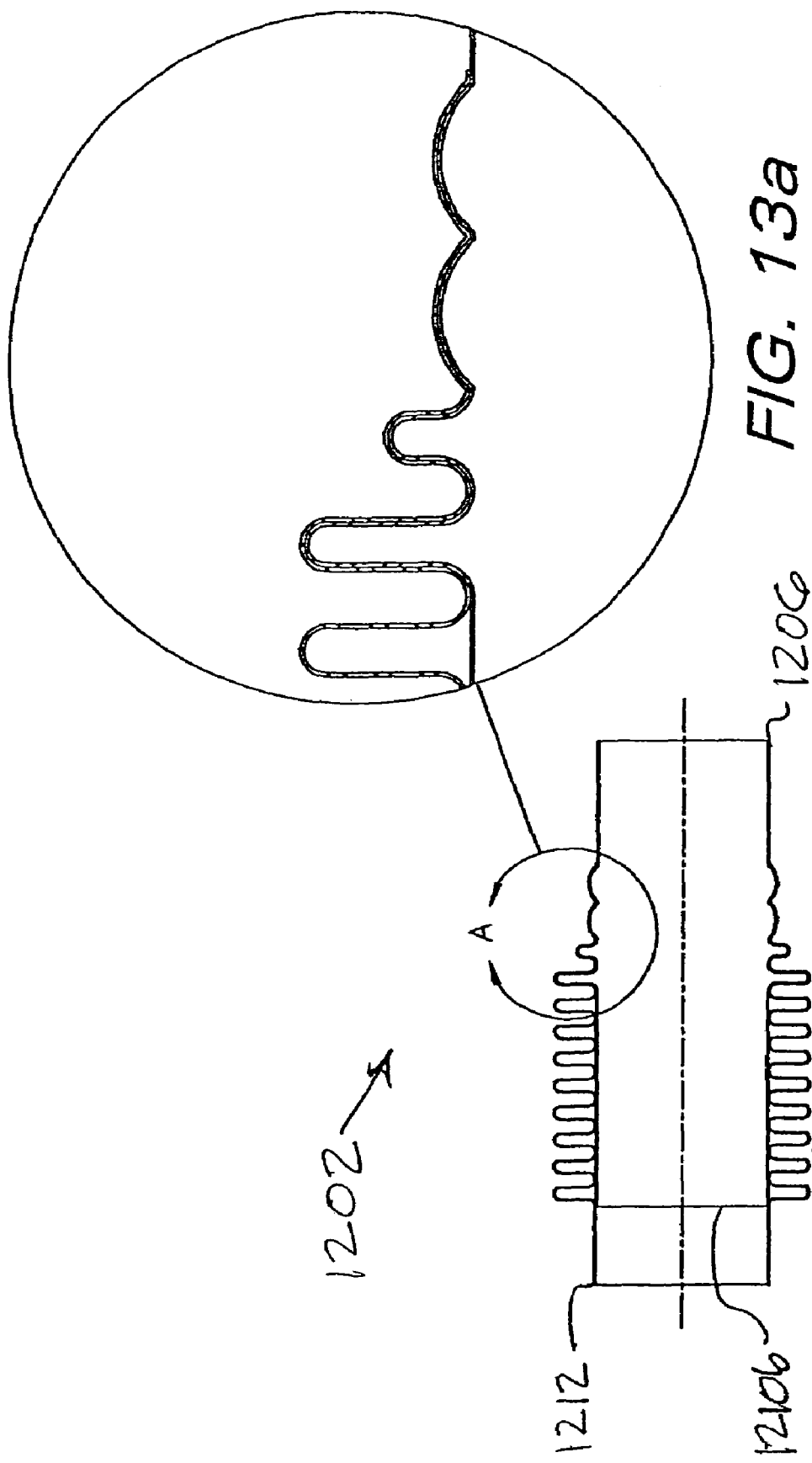

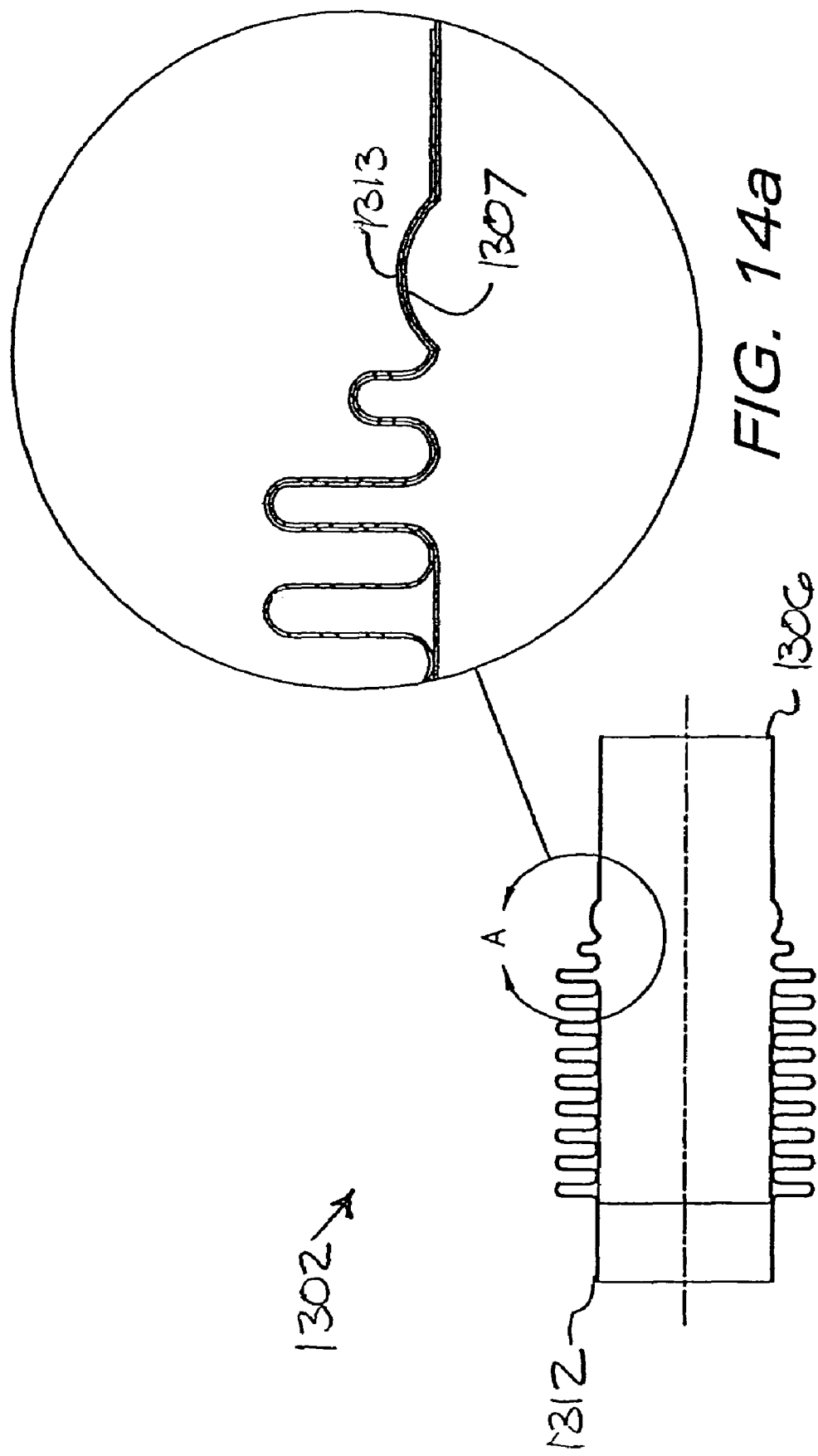

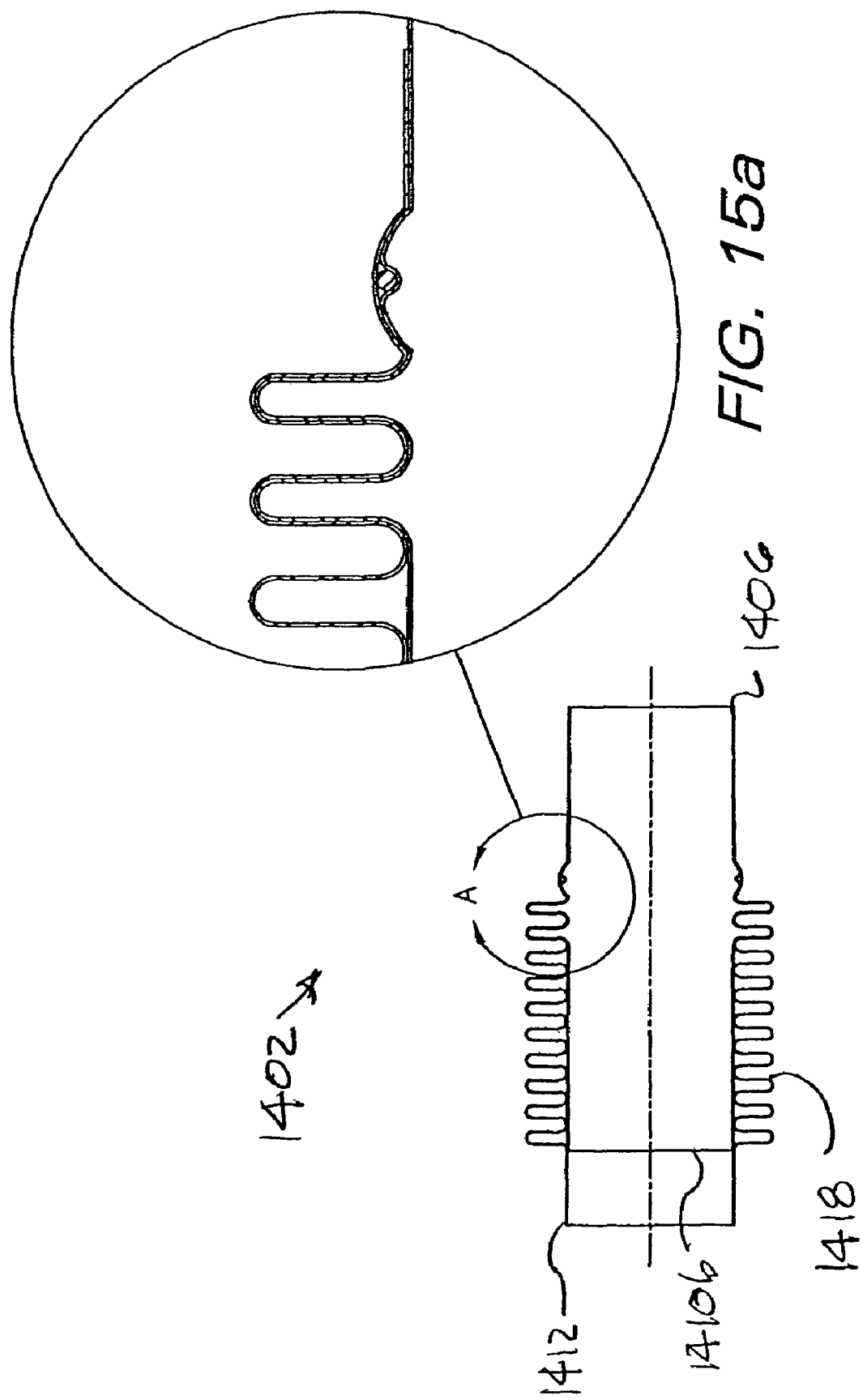

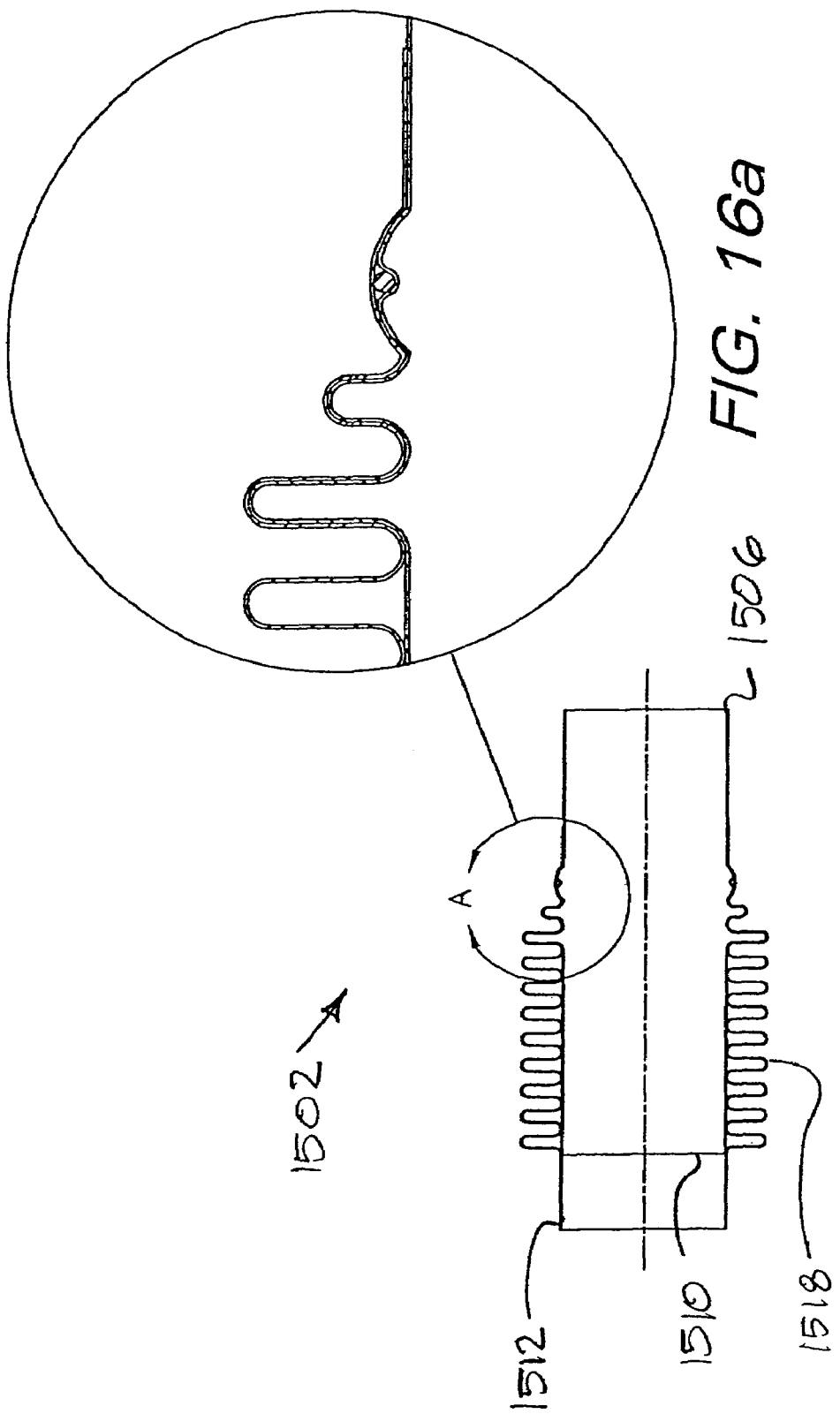

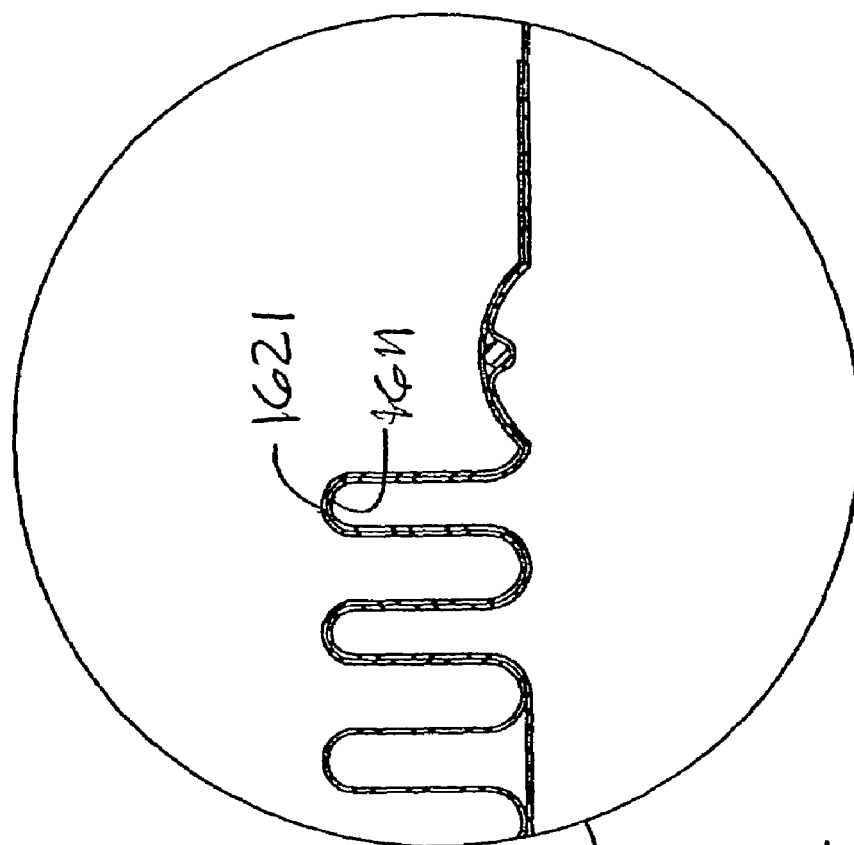
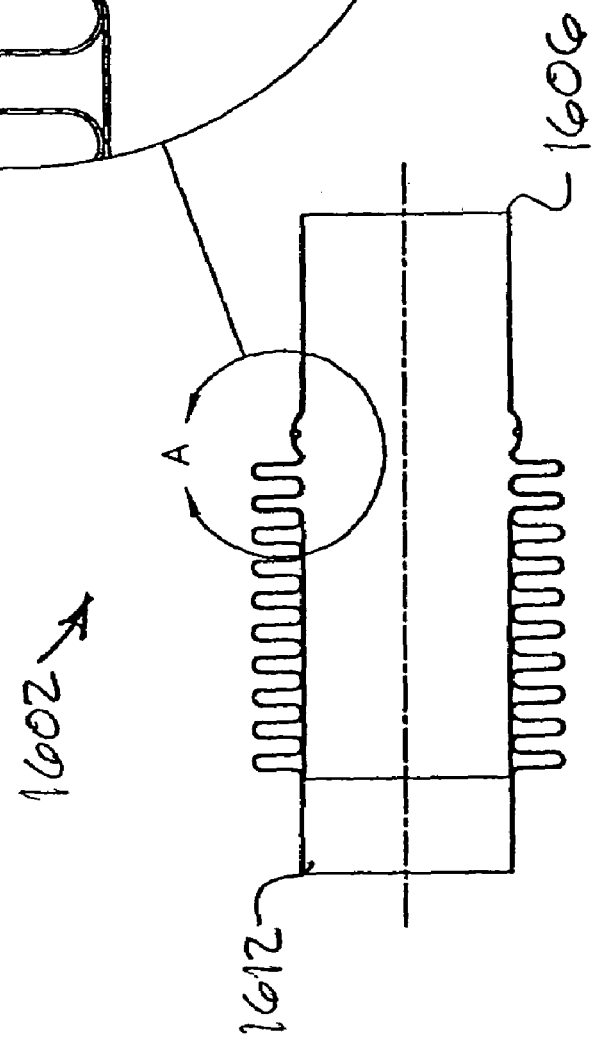
FIG. 17a
FIG. 17

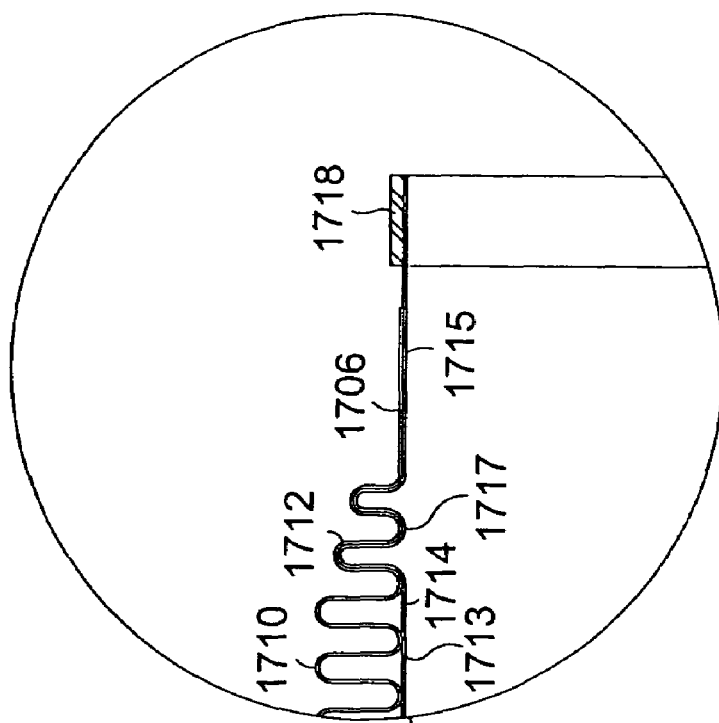
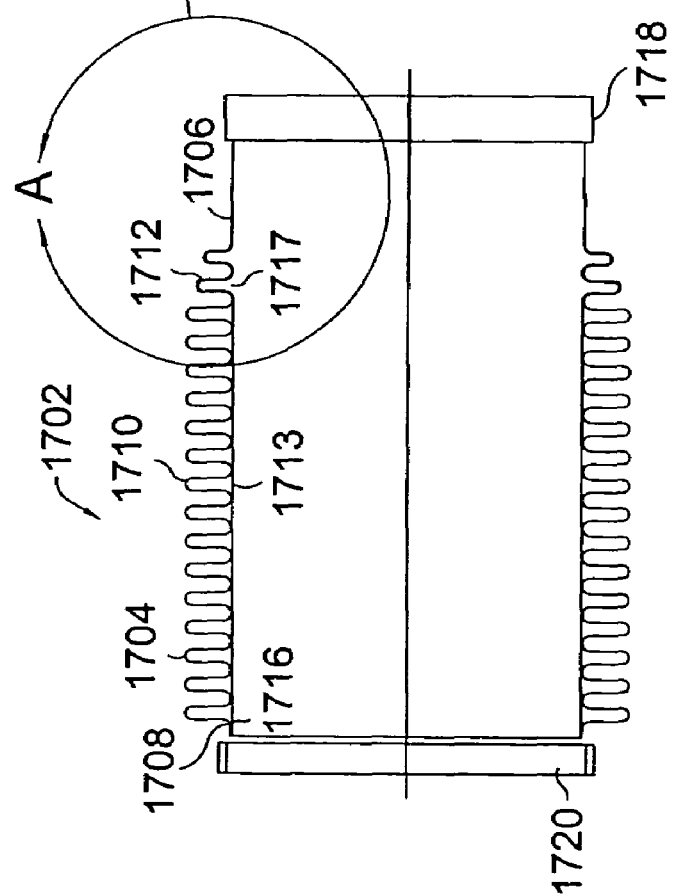

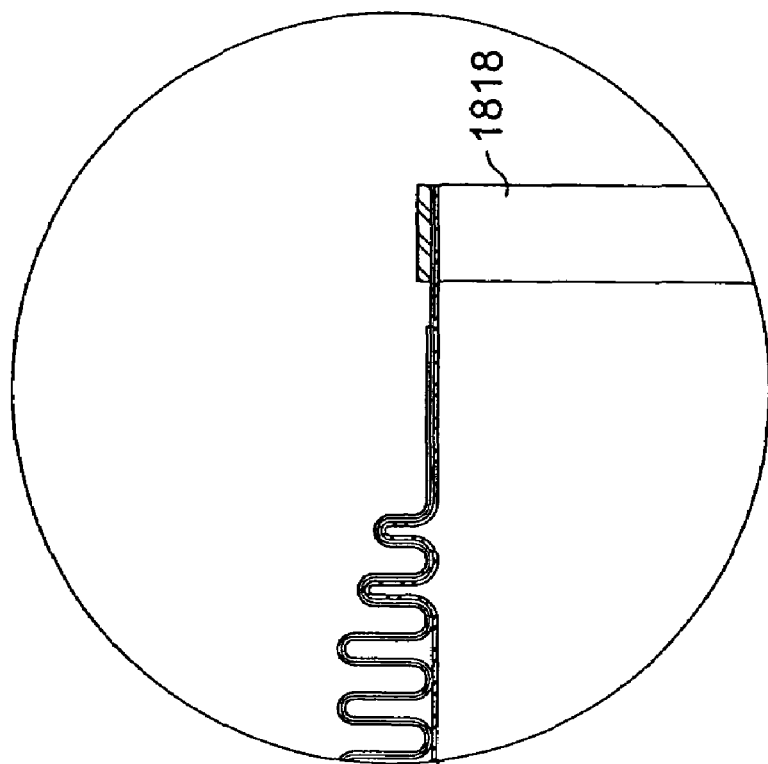
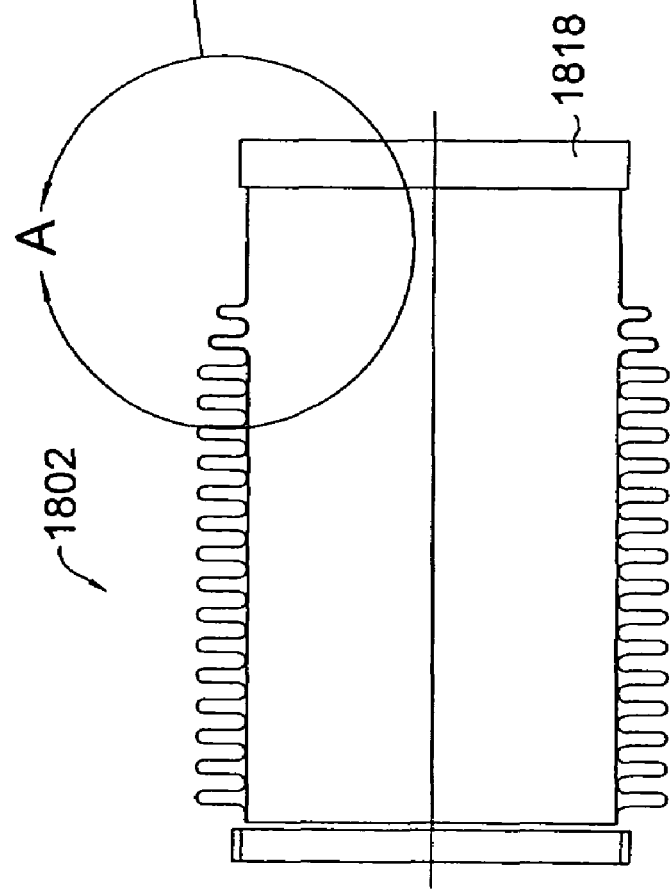
FIG. 19a
FIG. 19

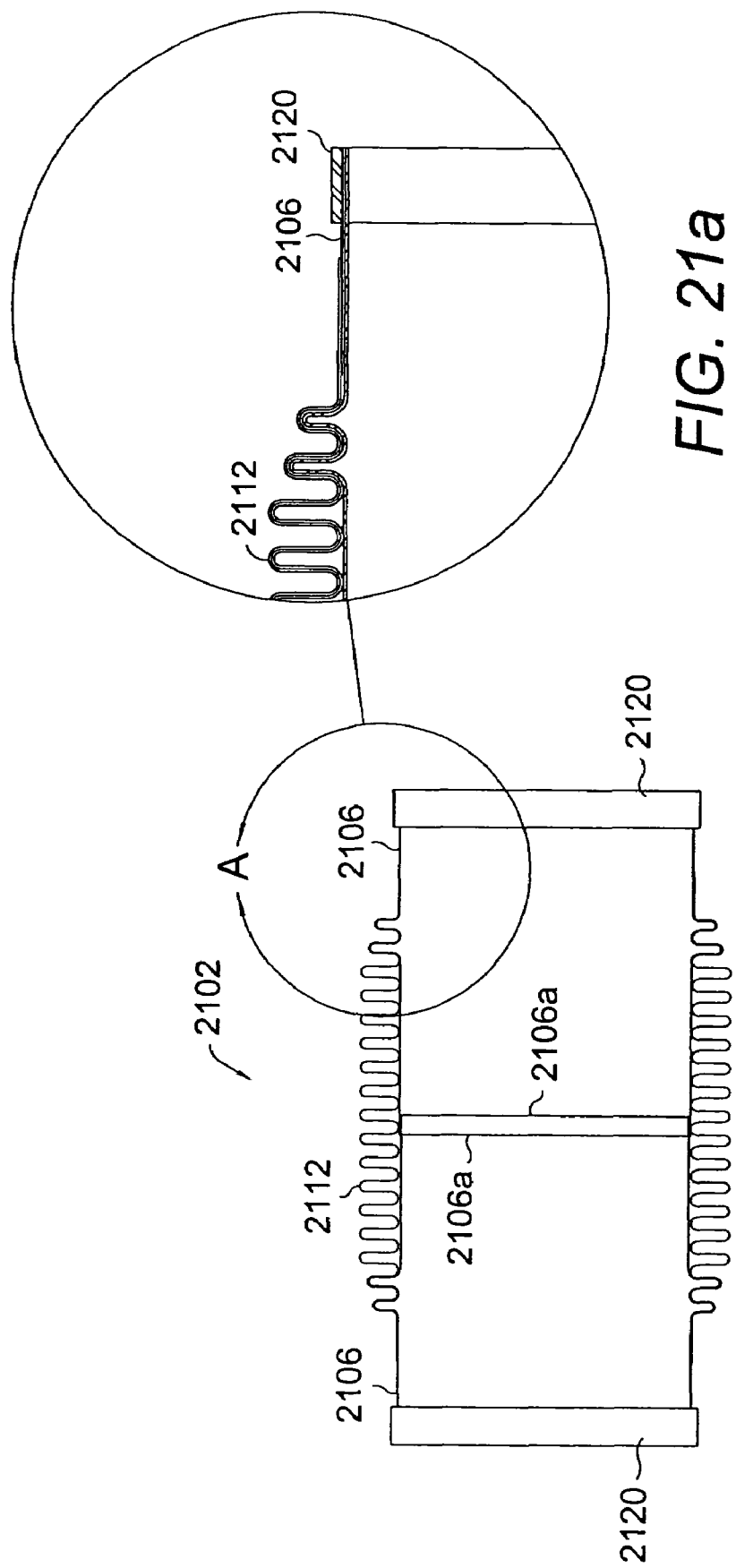

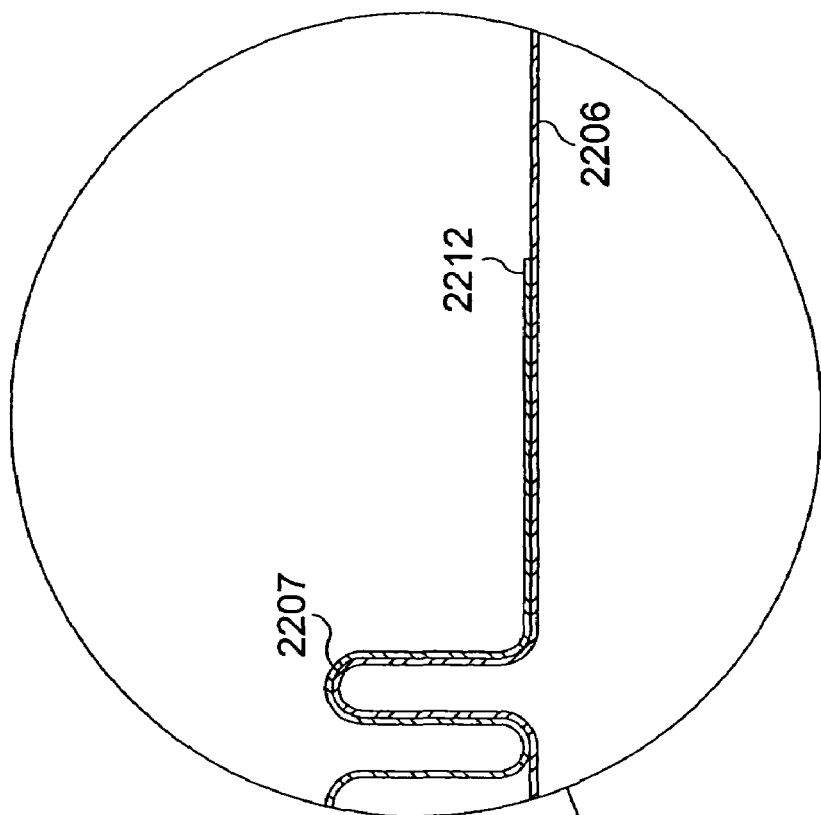
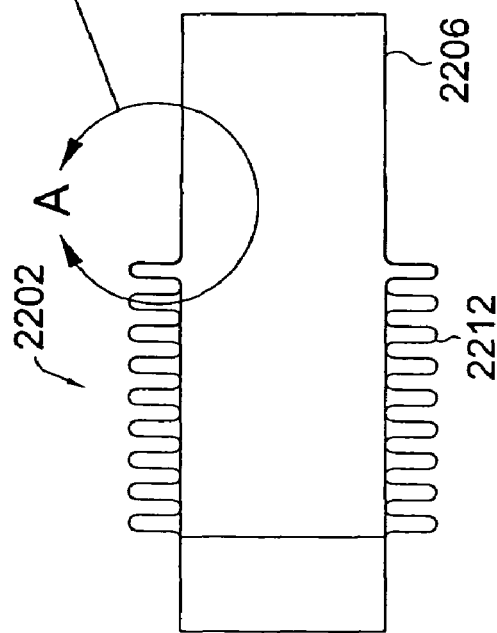
FIG. 22a
FIG. 22

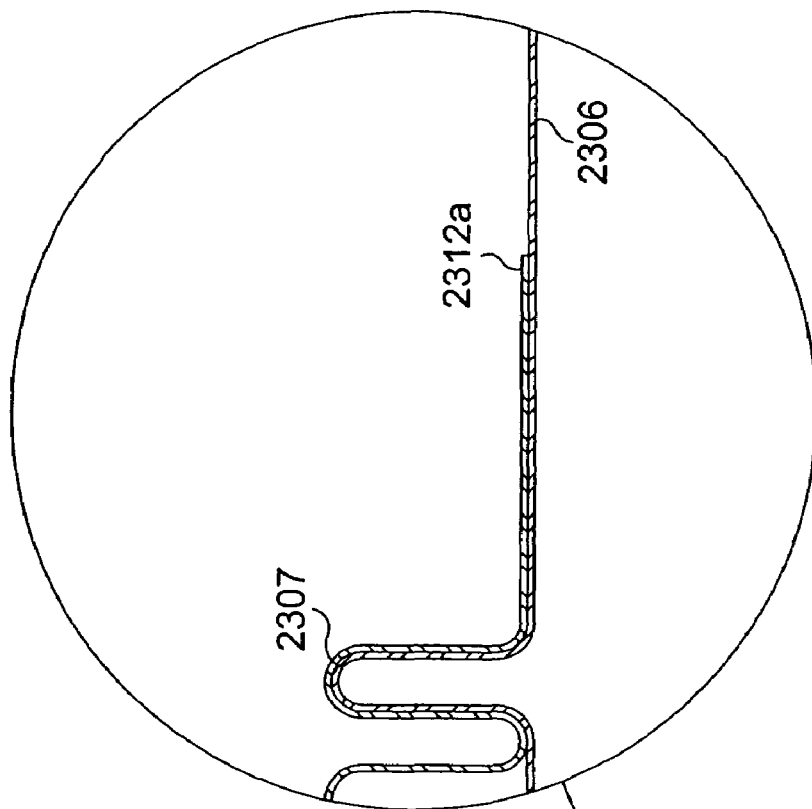
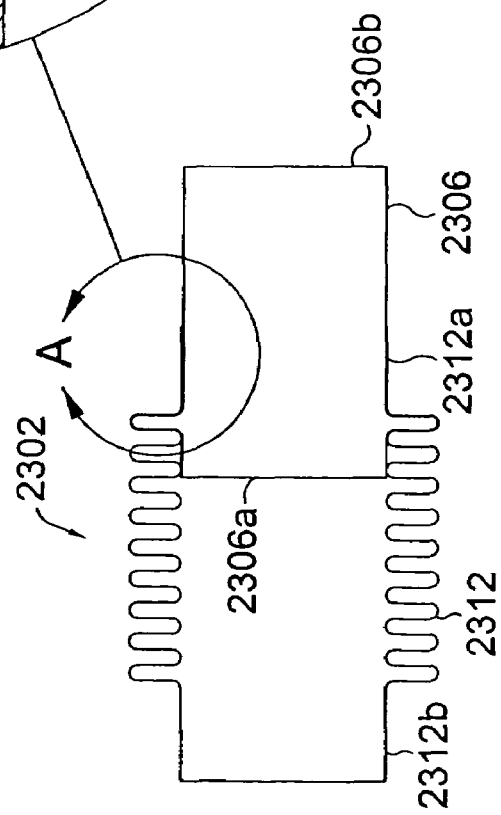
FIG. 23a
FIG. 23

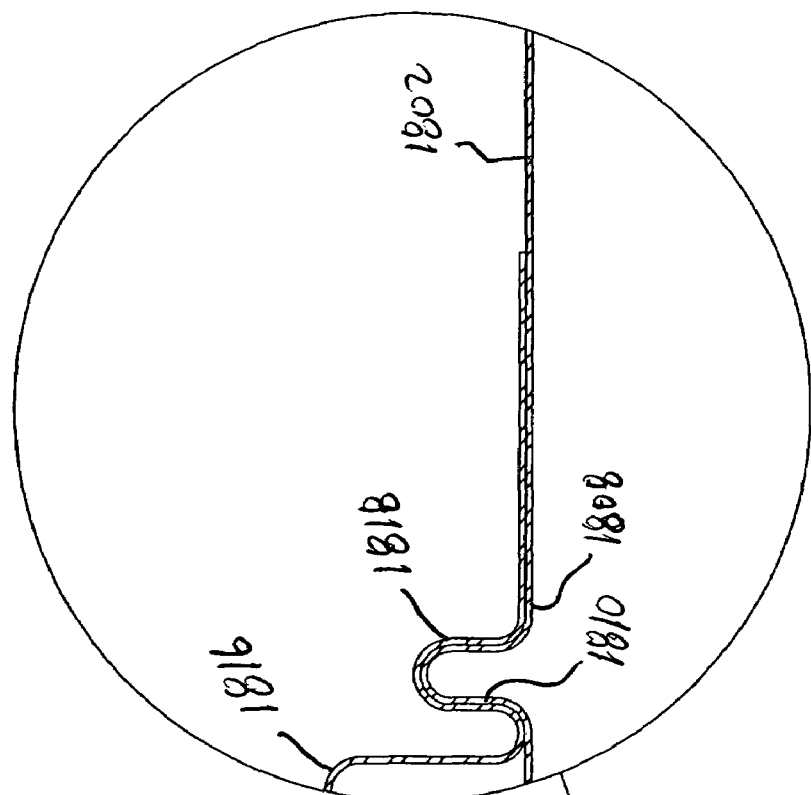
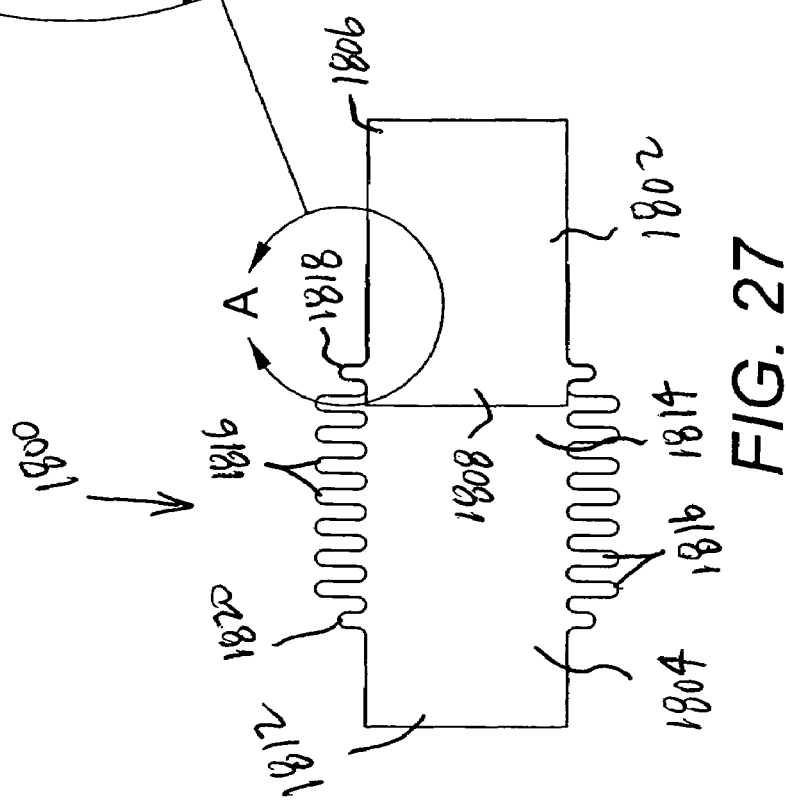
FIG. 27a
FIG. 27

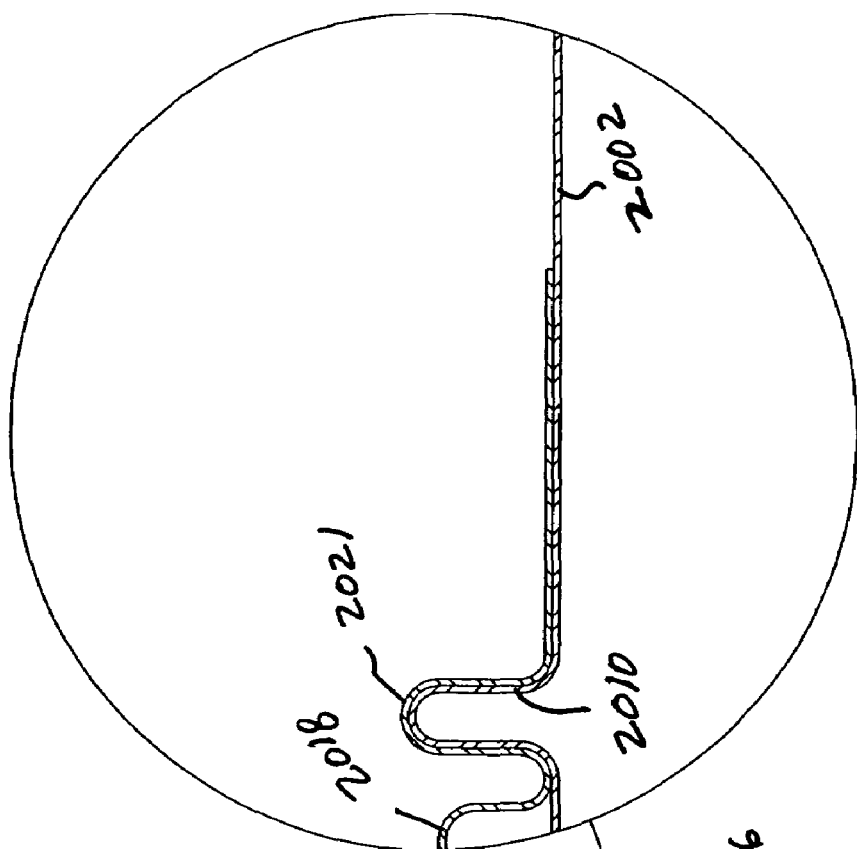
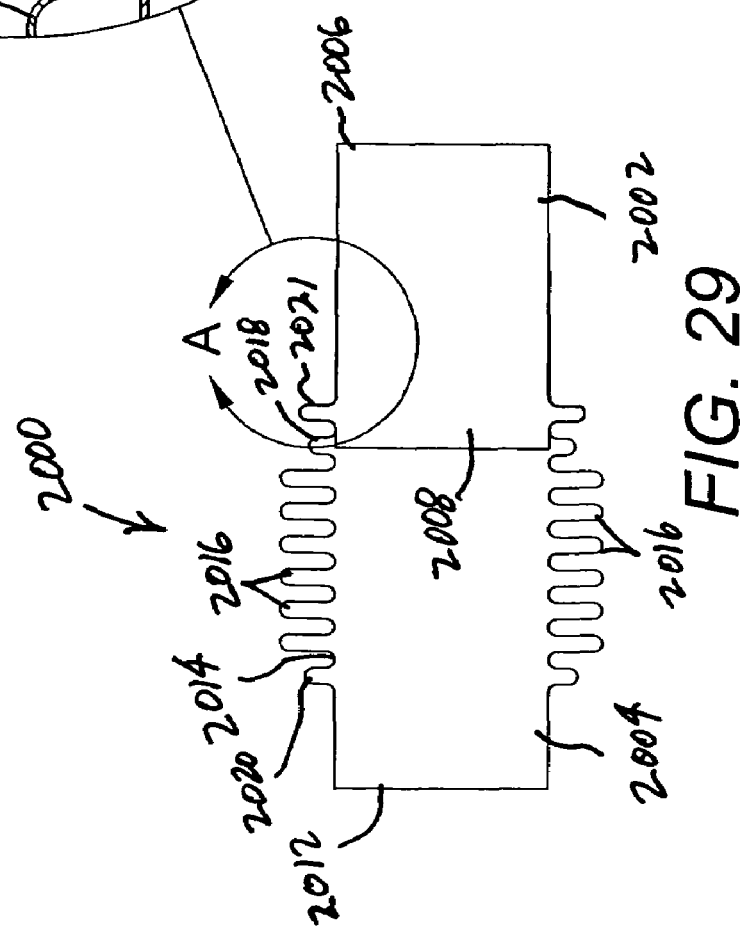
FIG. 29a
FIG. 29

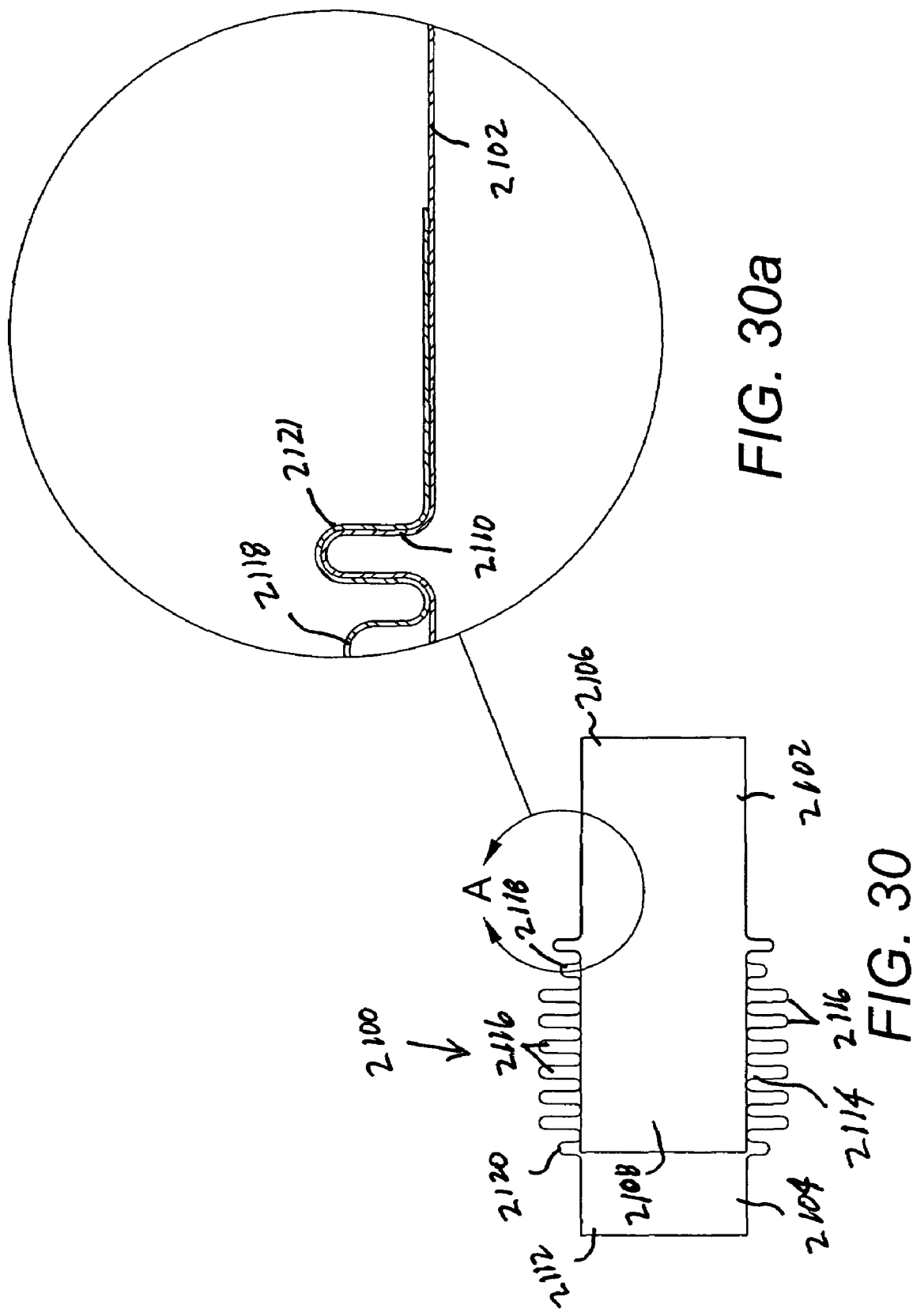

EXHAUST BELLOWS FOR DYNAMIC TORSION CONTROL IN AN EXHAUST SYSTEM

CROSS REFERENCE TO RELATED APPLICATION

This application claims the benefit of U.S. Ser. No. 10/121,628 filed Apr. 12, 2002 which application claims the benefit of provisional patent application Ser. No. 60/318,516 filed Sep. 10, 2001.

BACKGROUND OF THE INVENTION

1. Field of the Invention

The present invention relates generally to flexible hoses, and in particular to a flexible hose section which controls dynamic stresses in a system with components which are subjected to different dynamic forces.

2. Description of the Related Art

Conduit and piping systems for conveying fluids and bulk materials are used in a wide variety of applications. Various components for such systems have been devised to accommodate different fluids and materials and to operate in particular environments. For example, some of the components of such systems are fabricated from flexible metal hose, which offers the advantages of durability, flexibility, relatively low cost and adaptability to various sizes, configurations and materials.

Flexible metal hose has been used for many years to interconnect components which move relative to each other. Some of the common configurations of flexible mental hose include spiral-wound, edge-interlocked hose wherein the edges of a strip of sheet metal are interlocked on a hose winding machine to permit limited deflection of the resulting flexible metal hose. Corrugated flexible metal hose is another type of hose that can be used. The corrugations provide flexibility and permit a corrugated pipe or hose section to be bent and shaped more easily than a comparable hose section with smooth walls. Moreover, corrugations can dissipate dynamic stresses associated with the vibration of the components to which the flexible hose section is attached.

Corrugated flexible hose sections can have corrugations of different diameters, such as bellows-type arrangement with the largest-diameter corrugations in the center and corrugations of decreasing diameters towards the ends whereby maximum flexibility is achieved in the center with increasing stiffness toward the ends (see U.S. Pat. No. 5,769,463 to Thomas). Such bellows-type configurations tend to be relatively efficient at dissipating vibrational energy toward their centers for dissipation.

Hybrid flexible metal hose sections have also been fabricated from corrugated sheet metal bands which are spiral wound with their edges interlocked. The resulting hose sections can provide the advantages of both interlocked-edge and corrugated types of flexible metal hose. Such hybrid hose designs can combine the advantages of both of these flexible metal hose types. For example, see the Thomas U.S. Pat. No. 5,494,319.

The disclosure of this patent, and also of the Thomas U.S. Pat. No. 5,882,046, are incorporated herein by reference.

Exhaust systems for internal combustion engines are examples of relatively severe environments in which the operating characteristics of flexible metal hoses can be used to advantage. Flexible metal hose sections are often used for connecting exhaust pipes from vehicle internal combustion engines with manifold mufflers, tail pipes and other exhaust system components. Flexible metal hose sections are commonly used in exhaust systems of tractors of tractor-trailer truck rigs and off road and construction vehicles because of their flexibility, temperature resistance and corrosion resistance when fabricated from suitable materials, such as stainless steel, galvanized steel or other metals.

Exhaust systems in general and vehicle exhaust systems in particular must perform reliably under relatively severe operating conditions, which can include temperature extremes, corrosive environmental factors and dynamic stress loading. Dynamic stresses in an exhaust system can originate from vibrations associated with the engine and movement of the vehicle. Such dynamic stresses include axial, lateral and angular forces, all of which can normally be effectively attenuated and controlled by flexible metal hose with corrugations and/or edge interlocking. However, torsional forces caused by the differential rotation of the exhaust system components connected by a flexible metal hose section can inflict significant damage, particularly when the flexible hose section ends are fixedly secured and the flexible section design is rigid with respect to rotational forces. Such dynamic torsional forces can lead to premature metal fatigue, cracking and failure of exhaust system components, including previous designs of flexible metal hose.

The present invention addresses these considerations in connection with the application of the flexible metal hose to applications involving dynamic stresses. Heretofore there has not been available a dynamic stress controlling flexible metal hose section with the advantages and features of the present invention.

SUMMARY OF THE INVENTION

In the practice of the present invention, a flexible hose section is provided which includes a body with a corrugated medial portion and first and second ends with first and second mouths. The body mouths receive the ends of upstream and downstream exhaust system pipe sections and are secured therein by suitable connectors, such as weldments, clamps, gaskets and the like. The hose section, through the arrangements of its corrugations and/or its end connections, permits relative rotational displacement between the exhaust pipe sections whereby dynamic torsional stress is attenuated in and controlled by the hose section. Alternative embodiments of the present invention include various arrangements of corrugations, end connections and multiple hose section body layers, which can include intermediate insulation layers and outer sleeves for greater dynamic stress control and heat resistance.

OBJECTS AND ADVANTAGES OF THE INVENTION

The principal objects and advantages of the present invention include providing a flexible hose section adapted to control dynamic stresses; providing such a hose section which is adapted to control axial, lateral, angular and rotational stresses; providing such a hose section which attenuates and dissipates forces associated with differential rotational forces in a system; providing such a hose section which dissipates heat; providing such a hose section which can be either rigidly or flexibly connected to other components in a system; providing such a hose section which can be fabricated from a variety of different materials; providing such a hose section which can operate effectively in relatively severe operating conditions, such as those associated with vehicle exhaust systems; providing such a hose section which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a longitudinal, cross-sectional view of an exhaust bellows embodying the present invention.

FIG. 1a is an enlarged, cross-sectional view thereof taken generally within Circle A in FIG. 1.

FIG. 2 is a longitudinal, cross-sectional view of an exhaust bellows comprising a first alternative embodiment of the present invention with a shortened inner section.

FIG. 2a is an enlarged, fragmentary view thereof taken generally within the Circle A in FIG. 2.

FIG. 3 is a longitudinal, cross-sectional view of an exhaust bellows comprising a second alternative embodiment of the present invention, a tapered corrugation configuration at the bellows ends.

FIG. 3a is an enlarged, fragmentary, cross-sectional view thereof taken generally within Circle A in FIG. 3.

FIG. 4 is a longitudinal, cross-sectional view of an exhaust bellows comprising a third alternative embodiment of the present invention with a tapered corrugation at one end of the bellows.

FIG. 4a is an enlarged, fragmentary, cross-sectional view thereof taken generally within Circle A in FIG. 4 (with an annular protrusion at one end of the bellows).

FIG. 5 is a longitudinal, cross-sectional view of an exhaust bellows comprising a fourth alternative embodiment of the present invention.

FIG. 5a is an enlarged, fragmentary, cross-sectional view thereof taken generally within Circle A of FIG. 5.

FIG. 6 is a longitudinal, cross-sectional view of an exhaust bellows comprising a fifth alternative embodiment with tapered corrugations and double annular protrusions at one end of the bellows.

FIG. 6a is an enlarged, fragmentary, cross-sectional view thereof taken generally within Circle A in FIG. 6.

FIG. 7 is a longitudinal, cross-sectional view of an exhaust bellows comprising a sixth alternative embodiment of the present invention, with tapered corrugations and a single annular protrusion at one end of the bellows.

FIG. 7a is an enlarged, fragmentary, cross-sectional view thereof taken generally within Circle A in FIG. 7.

FIG. 8 is a longitudinal, cross-sectional view of an exhaust bellows comprising a seventh alternative embodiment of the present invention, with annular packing captured within an annular protrusion at one end of the bellows.

FIG. 8a is an enlarged, fragmentary, cross-sectional view thereof taken generally within Circle A in FIG. 8.

FIG. 10 is a longitudinal, cross-sectional view of an exhaust bellows comprising a ninth alternative embodiment of the present invention, with tapered corrugations at both ends of the bellows and with the inner section extending for the entire length of the bellows.

FIG. 10a is an enlarged, fragmentary, cross-sectional view thereof taken generally within Circle A in FIG. 10.

FIG. 11 is a longitudinal, cross-sectional view of an exhaust bellows comprising a tenth alternative embodiment of the present invention, with a tapered corrugation at one end of the bellows and with the inner section extending substantially the entire length of the bellows.

FIG. 11a is an enlarged, fragmentary, cross-sectional view thereof taken generally within Circle A in FIG. 11.

FIG. 12 is a longitudinal, cross-sectional view of an exhaust bellows comprising an eleventh alternative embodiment of the present invention, with an annual protrusion located at one end of the bellows and with the inner section extending for substantially the entire length thereof.

FIG. 12a is an enlarged, fragmentary, cross-sectional view thereof taken generally within Circle A in FIG. 12.

FIG. 13 is a longitudinal, cross-sectional view of an exhaust bellows comprising an twelfth alternative embodiment of the present invention, with tapered corrugations and two annular protrusions located at one end of the bellows and with the inner bellows section extending for substantially the entire length thereof.

FIG. 13a is an enlarged, fragmentary, cross-sectional view thereof taken generally within Circle A in FIG. 13.

FIG. 14 is a longitudinal, cross-sectional view of an exhaust bellows comprising a thirteenth alternative embodiment of the present invention, with a tapered corrugation and an annular protrusion at one end of the bellows, and with the inner section extending for substantially the entire length thereof.

FIG. 14a is an enlarged, fragmentary, cross-sectional view thereof taken generally within Circle A in FIG. 14.

FIG. 15 is a longitudinal, cross-sectional view of an exhaust bellows comprising a fourteenth alternative embodiment of the present invention, with an annular sealing gasket located in an annular protrusion at one end of the bellows and with the bellows inner section extending for substantially the entire length thereof.

FIG. 15a is an enlarged, fragmentary, cross-sectional view thereof taken generally within Circle A in FIG. 15.

FIG. 16 is a longitudinal, cross-sectional view of an exhaust bellows comprising a fifteenth alternative embodiment of the present invention, with an annular gasket captured within an annular protrusion and with a tapered corrugation at one end of the bellows and with the bellows inner section extending for substantially the entire length thereof.

FIG. 16a is an enlarged, fragmentary, cross-sectional view thereof taken generally within Circle A in FIG. 16.

FIG. 17 is a longitudinal, cross-sectional view of an exhaust bellows comprising a sixteenth alternative embodiment of the present invention, with an annular gasket captured within an annular protrusion at one end of the bellows and with the inner section extending for substantially the entire length thereof.

FIG. 17a is an enlarged, fragmentary, cross-sectional view thereof taken generally within Circle A in FIG. 17.

FIG. 18 is a longitudinal, cross-sectional view of an exhaust bellows comprising a seventeenth alternative embodiment of the present invention, with a double-ply construction at a tapered bellows end and a stainless ring located at both ends thereof.

FIG. 18a is an enlarged, fragmentary, cross-sectional view thereof taken generally within Circle A in FIG. 18.

FIG. 19 is a longitudinal, cross-sectional view of an exhaust bellows comprising an eighteenth alternative embodiment of the present invention, which is similar to the eighth alternative embodiment but comprised of a different material with different proportions.

FIG. 19a is an enlarged, fragmentary, cross-sectional view thereof taken generally with Circle A in FIG. 19.

FIG. 21 is a longitudinal, cross-sectional view of an exhaust bellows comprising a twentieth alternative embodiment of the present invention, which is similar to the tenth alternative embodiment but with liners extending further into the bellows.

FIG. 21a is an enlarged, fragmentary, cross-sectional view thereof taken generally within Circle A in FIG. 21.

FIG. 22 is a longitudinal, cross-sectional view of an exhaust bellows comprising a twenty-first alternative embodiment of the present invention with a liner located within the bellows and a single corrugation overlapping.

FIG. 22a is an enlarged, fragmentary, cross-sectional view thereof taken generally with Circle A in FIG. 22.

FIG. 23 is a longitudinal, cross-sectional view of an exhaust bellows comprising a twenty-second alternative embodiment of the present invention, which is similar to the twelfth alternative embodiment but with a shorter liner.

FIG. 23a is an enlarged, fragmentary, cross-sectional view thereof taken generally.

FIG. 27 is an elevational view of an exhaust bellows comprising an additional alternative embodiment of the present invention and including mating conduit sections having relatively small corrugations that mate with one another to allow relative rotation of the conduit sections while providing a seal between them.

FIG. 27a is an enlarged, fragmentary, cross-sectional view of the detail identified by the letter A in FIG. 27.

FIG. 29 is an elevational view of an exhaust bellows comprising still another alternative embodiment of the present invention, with the bellows of FIG. 29 having a pair of conduit sections that are provided with mating corrugations that are intermediate in size.

FIG. 29a is a fragmentary sectional view on an enlarged scale of the detail identified by the letter A in FIG. 29.

FIG. 30 is an elevational view of an exhaust bellows comprising yet another embodiment of the present invention which is similar to the embodiment shown in FIG. 29 except that the embodiment of FIG. 30 includes a conduit section that extends inside of the corrugations of the other conduit section.

FIG. 30a is a fragmentary sectional view on an enlarged scale of the detail identified by the letter A in FIG. 30.

DETAILED DESCRIPTION OF THE INVENTION

Detailed Description of the Preferred Embodiments

I. Introduction and Environment

Figure 9A:
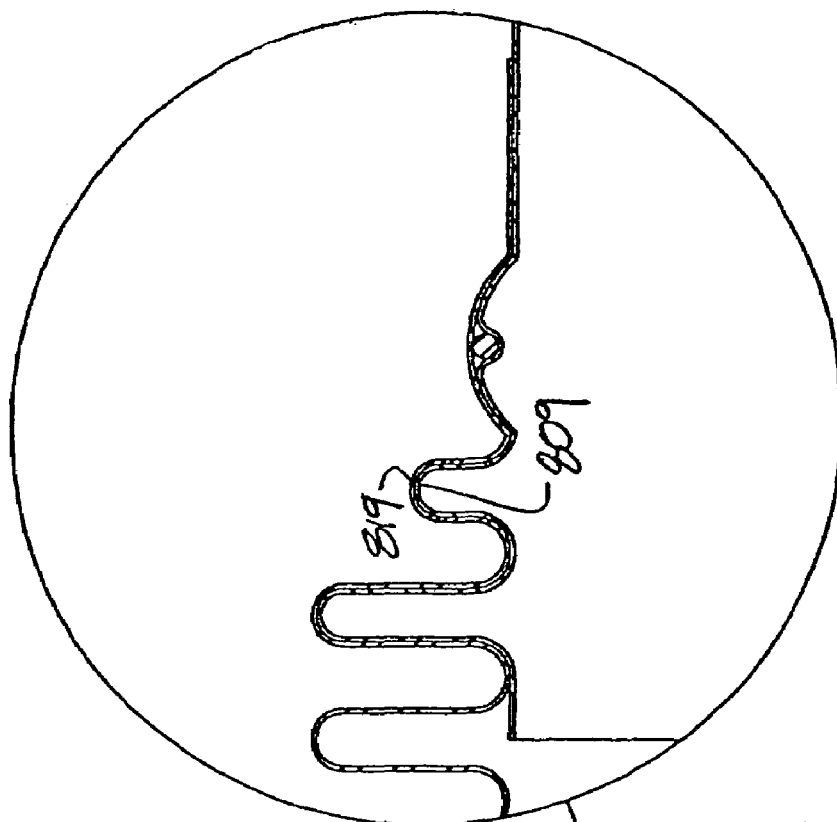
FIG. 9a is an enlarged, fragmentary, cross-sectional view thereof taken generally within Circle A in FIG. 9.
Figure 9:
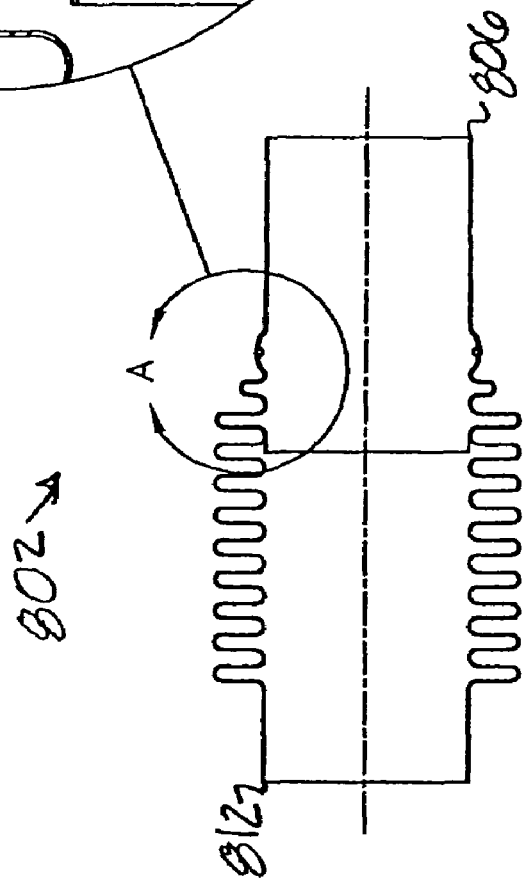
FIG. 9 is a longitudinal, cross-sectional view of an exhaust bellows comprising an eighth alternative embodiment of the present invention, with an annular gasket captured within an annular protrusion and with tapered corrugations at one end of the bellows.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Primary Embodiment Bellows 2.

Referring to the drawing in more detail, the reference numeral 2 generally designates an exhaust bellows for an exhaust system 4 embodying the present invention. The exhaust system 4 includes upstream and downstream exhaust pipe sections 4a,b with ends 4c,d whereat bores 4e,f are open. The bellows 2 includes an upstream, inner section 6 with corrugations 8 including alternating lands 8a and grooves 8b. The inner section 6 has an upstream end 10a adapted to be received within the upstream exhaust pipe section 4a and a downstream end 10b. A downstream, outer section 12 of the bellows 2 telescopically receives a downstream portion of the upstream, inner section 6 and includes a downstream end 14b with a bore 16 extending through the exhaust bellows. The downstream, outer section 12 includes corrugations 18 with alternating lands 18a and grooves 18b. The corrugations 8, 18 of the inner and outer sections 6, 12 overlie at a two-ply section 20 which is located adjacent to the outer section upstream end 14a and extends through approximately two corrugation lands 8a, 18a. However, the two-ply section 20 could extend for a greater or lesser distance and can assume various configurations, as will be described in more detail below. A coating of lubricant 22 and a dissimilar metal can be provided between the inner and outer sections 6, 12 within the two-ply section 20 to facilitate relative movement (i.e., rotation) therebetween. The materials comprising the sections 6, 12 can be chosen from a wide range of suitable materials chosen for corrosion resistance, strength, flexibility and ability to accommodate temperature changes. Price is also a factor in selecting the appropriate material. Examples include stainless steel number 304, 316, 321, 316TI (Titanium), 316L (low carbon) and various alloys.

The bellows 2 can be hydro-formed or mechanically formed to produce the corrugations 8, 18. The corrugated portions of the sections 6, 12 are preferably tightly fit to provide an effective seal therebetween but the annular corrugated configurations thereof facilitate relative rotation therebetween in response to torsional stress loads on the bellows 2. Such relative rotation can be further facilitated by utilizing a lubricant coating 22 therebetween, as described above. Still further, various liners and coatings, including high temperature plastics, metals or other materials could be located between the corrugations 8, 18.

II. First Alternative Embodiment Bellow 102.

FIGS. 2 and 2a show a bellows 102 comprising a first alternative embodiment of the present invention with a shortened inner section 106 terminating at a downstream end 110b located within the corrugated portion of the outer section 112.

IV. Second Alternative Embodiment Bellows 202.

FIGS. 3 and 3a show a bellows comprising a second alternative embodiment of the present invention. The bellows 202 includes a shortened inner section 204 terminating at a downstream end 210b and a corrugated section 208 located in proximity thereto. The corrugated section 208 includes an upstream, reduced-diameter corrugation 208a and a downstream increase-diameter corrugation 208b.

A downstream outer section 212 also includes a corrugated section 218 with reduced-diameter corrugations 219 corresponding to the inner section reduced-diameter corrugations 209 and enlarged-diameter corrugations 221 corresponding to the inner section enlarged-diameter corrugations 211. The smaller-diameter corrugations 209, 219 tend to be stiffer than the larger-diameter corrugations 211, 221 and thus tend to transmit the vibrational forces towards the middle portion of the bellows 212.

V. Third Alternative Embodiment Bellows 302.

FIGS. 4 and 4a show a bellows 302 comprising a third alternative embodiment of the present invention, with a construction similar to the bellows 202 described above except that an outer section 312 is provided with a corrugated section 318 with a single reduced-diameter corrugation 319 at an upstream end of the corrugated section 318 and enlarged-diameter corrugations 321 comprising the remainder of the corrugated section 318.

VI. Fourth Alternative Embodiment Bellows 402.

FIGS. 5 and 5a show a bellows 402 comprising a fourth alternative embodiment of the present invention. The bellows 402 includes inner and outer sections 406, 412 respectively. The sections 406, 412 include corresponding annular, outwardly-convex protrusions 407 and 413 respectively. The annular protrusions 407, 413 closely overlie each other and provide an additional area of sealing contact between the inner and outer sections 406, 412.

VII. Fifth Alternative Embodiment Bellows 502.

A bellows 502 comprising a fifth alternative embodiment of the present invention is shown in FIGS. 6 and 6a. The bellows 502 includes inner and outer sections 506, 512 respectively. The inner section 506 includes a pair of protrusions 507 similar to the protrusions described above. The outer section 512 also includes a pair of protrusions 513, also similar to the protrusion 413 described above. The sections 506 and 512 also include reduced and enlarged-diameter corrugations 509, 511 and 519, 521 respectively, which are similar to those described above.

VIII. Sixth Alternative Embodiment Bellows 602.

FIGS. 7 and 7a show a bellows 602 comprising a sixth alternative embodiment of the present invention. The bellows 602 is similar to the bellows 502 described above, except that only single protrusions 607, 613 are provided on an inner section 606 and an outer section 612 respectively.

IX. Seventh Alternative Embodiment Bellows 702.

FIGS. 8 and 8a show a bellows 702 comprising a seventh alternative embodiment of the present invention. The bellows 702 includes an inner section 706 and an outer section 712. The inner section 706 includes an annular projection 707 with an annular channel 709 formed therein. The outer section 712 includes an annular projection 713 which encloses the annular channel 709 to provide an internal raceway 711 which receives an annular packing ring 715. The packing ring 715 can comprise a suitable material, such as fabric or metal, which can be adapted for high temperature applications and can provide additional packing against leakage.

X. Eighth Alternative Embodiment Bellows 802.

The bellows 802 is similar to the bellows 702 described above, except that reduced-diameter corrugations 809, 819 are provided in inner and outer sections 806, 812 respectively.

XI. Ninth Alternative Embodiment Bellows 902.

FIGS. 10 and 10a show a ninth alternative embodiment bellows 902 with inner and outer section 906, 912 respectively. The inner section 906 is elongated and terminates at a downstream end 910b located just downstream of a corrugated length 918 of the outer section 912. The inner and outer section 906, 912 include reduced-diameter corrugations 909, 919 respectively at the upstream end of the corrugated length 918. Additionally, the outer section 912 includes a reduced-diameter corrugation 919 located at the downstream end of the corrugated length 918.

XII. Tenth Alternative Embodiment Bellows 1002.

FIGS. 11 and 11a show a bellows 1002 comprising a tenth alternative embodiment of the present invention. The bellows 1002 includes an inner section 1006 and an outer section 1012. The bellows 1002 is substantially similar to the bellows 902, except that the outer section 1012 does not include a reduced-diameter corrugation 1019 at its downstream end, but does include such a corrugation at its upstream end which cooperates with and overlies a reduced-diameter corrugation of the inner section 1006.

XIII. Eleventh Alternative Embodiment Bellows 1102.

FIGS. 12 and 12a show a bellows 1102 comprising an eleventh alternative embodiment of the present invention. The bellows 1102 is similar to the bellows 402 described above, except that an inner section 1106 thereof is relatively long and extends for substantially the entire length of a corrugated length 1118 of the outer section 1112.

XIV. Twelfth Alternative Embodiment Bellows 1202.

A bellows 1202 comprising the eleventh alternative embodiment is shown in FIGS. 13 and 13a. The bellows 1202 is similar to the bellows 502 described above, except that the inner section 1206 thereof is elongated and terminates at a downstream end 1210b located just downstream of a corrugated length 1218 of an outer section 1212.

XV. Thirteenth Alternative Embodiment Bellows 1302.

FIGS. 14 and 14a show a thirteenth alternative embodiment bellows 1302 including an inner section 1306 and an outer section 1312. The bellows 1302 is similar to the bellows 1202 described above, except that the inner and outer sections 1306, 1312 respectively include only single annular protrusions 1307 and 1313 respectively.

XVI. Fourteenth Alternative Embodiment Bellows 1402.

FIGS. 15 and 15a show a bellows 1402 comprising a fourteenth alternative embodiment of the present invention.

The bellows 1402 is similar to the bellows 702 described above, except that an inner section 1406 thereof is elongated with a downstream end 1410b located just downstream of a corrugated length 1418 of an outer section 1412.

XVII. Fifteenth Alternative Embodiment Bellows 1502.

FIGS. 16 and 16a show a bellows 1502 comprising a fifteenth alternative embodiment of the present invention. The bellows 1502 is similar to the bellows 802 described above except that an inner section 1506 thereof includes a downstream end 1510 located downstream from a corrugated length 1518 of an outer section 1512.

XVIII. Sixteenth Alternative Embodiment Bellows 1602.

FIGS. 17 and 17a show a bellows 1602 comprising a sixteenth alternative embodiment of the present invention. The bellows 1602 is similar to the bellows 1502 described above, except that all of the corrugations 1611 and 1621 of inner and outer sections 1606, 1612 respectively are of substantially uniform diameter.

XIX. Seventeenth Alternative Embodiment Bellows 1702

FIGS. 18 and 18a show a bellows 1702 comprising a seventeenth alternative embodiment of the present invention. The bellows 1702 includes an outer ply 1704 with generally cylindrical end sections 1706, 1708 and a bellows section 1710 therebetween. The bellows section 1710 includes a tapered end 1712.

An inner ply 1714 is positioned generally within the outer ply 1704 and includes generally cylindrical end sections 1715, 1716 with an intermediate section extending therebetween and located generally within the outer ply bellows section. The inner ply intermediate section includes an extended cylindrical section 1713 and a tapered bellows end section 1717 generally conforming to the configuration of the outer ply 1704. A rigid sealing ring 1718 is mounted on one end of the inner ply 1714. The opposite end of the outer ply 1704 receives another rigid sealing ring 1720. The rings may be applied to both ends, neither end, or one of the ends of the assembly as desired.

The inner ply bellows section can be conformed to the configuration of the outer ply bellows section by means of a hydroforming or mechanical manufacturing process performed with or without a layer of lubricant between the plies. The tapered bellows portion of the inner ply can extend for any desired length and include any desired number of corrugations within the outer ply bellows section.

The inner and outer plies 1704, 1712 can comprise any suitable material. For example, dissimilar materials and a lubricant can be used to avoid a galling interaction which can occur with two similar metals. Examples of suitable metals include stainless steel alloys designated 316, 316TI (Titanium), 316L (low carbon), 321 and 304. The stainless steel alloys with high number designations generally provide greater corrosion resistance, whereas lower numbers tend to be less expensive. Metals chosen for the inner and out ply constructions can have suitable properties of resistance to galvanic action.

XX. Eighteenth Alternative Embodiment Bellows 1802

FIGS. 19 and 19a show a bellows 1802 comprising an eighteenth alternative embodiment of the present invention. The bellows 1802 is similar to the bellows 1702 described above, with a multiple ply material comprising the inner ply and/or the outer ply. As discussed above, the materials, proportions and dimensions of the bellows can vary considerably within the scope of the present invention.

XXI. Nineteenth Alternative Embodiment Bellows 2002

Figures 20, 20A:
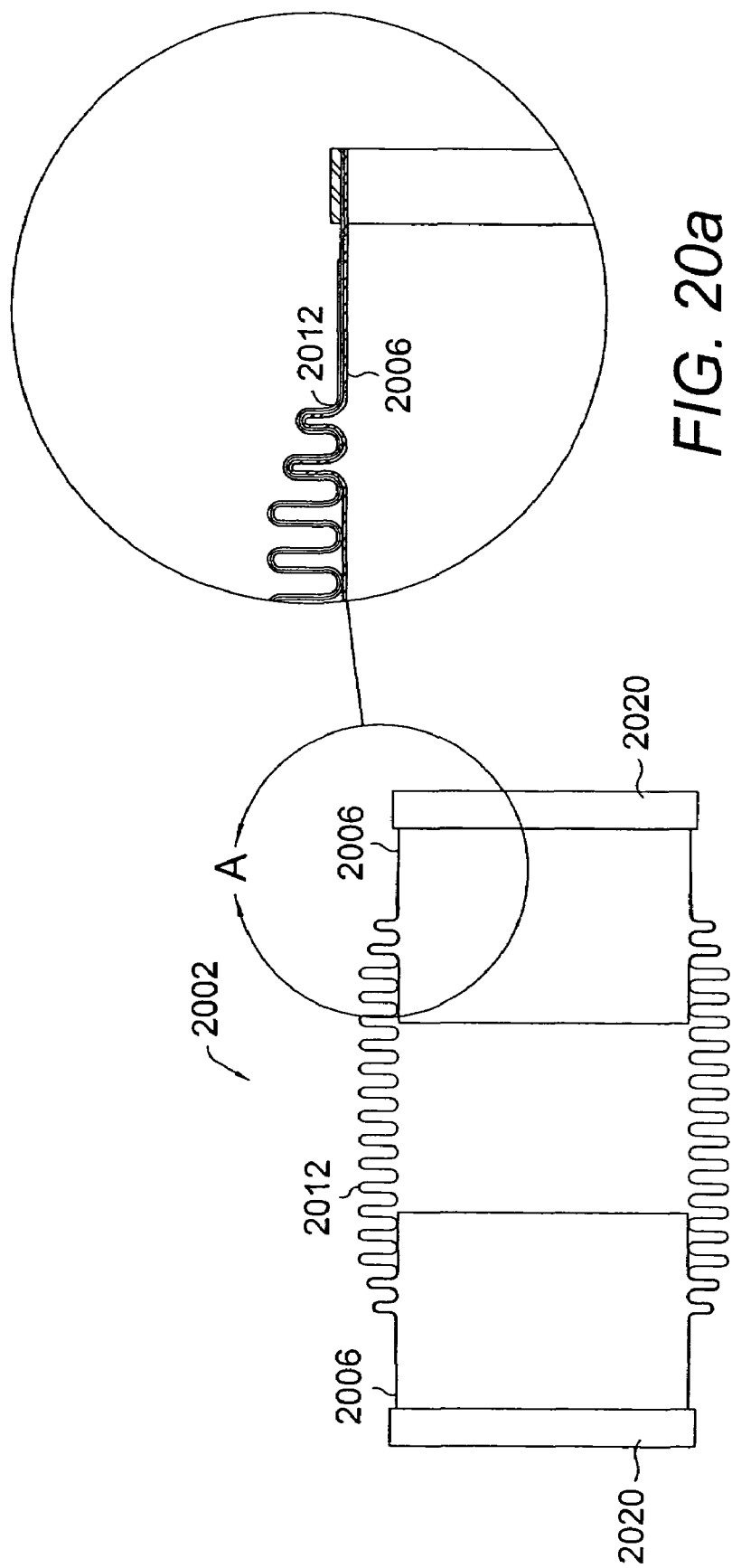
FIG. 20 is a longitudinal, cross-sectional view of an exhaust bellows comprising a nineteenth alternative embodiment of the present invention, with tapered bellows and sealing rings located at both ends thereof.
FIG. 20a is an enlarged, fragmentary, cross-sectional view thereof taken generally within Circle A in FIG. 20.

FIGS. 20 and 20a show a bellows 2002 comprising a nineteenth alternative embodiment of the present invention. The bellows 2002 includes an outer ply 2012 with corrugated, tapered bellows sections at both ends. First and second inner plies 2006 extend partway into the outer ply bellows section 2012 and terminate at inner ply ends which are positioned in spaced-apart relation.

In operation, the tapered bellows at both ends facilitate damping dynamic stresses. By providing a gap between the inner ply sections, torsional stress control is enhanced by facilitating slippage between the independent inner plies and outer ply. Still further, by providing connections between the inner and outer plies which are substantially fluid-tight, leakage can be controlled or at least greatly reduced. The end sections receive rings 2020 similar to rings 1720.

XXII. Twentieth Alternative Embodiment Bellows 2102

FIGS. 21 and 21a show a bellows 2102 comprising a twentieth alternative embodiment of the present invention. The bellows 2102 is similar to the bellows 2002 described above, except that the inner ply sections extend considerably further into the outer ply. Moreover, the inner ply sections terminate at ends 2106a which are only slightly spaced from each other. Rings 2120 are on the outer ends of the inner ply section 2106. Operationally, the bellows 2102 functions in a manner similar to the bellows 2002 described above, with a few operational differences resulting from the extended end sections. For example, extended portions of the extended ply section resist deflection by the extended lengths of inner ply captured within the outer ply.

XXIII. Twenty-First Alternative Embodiment Bellows 2202

FIGS. 22 and 22A show a bellows 2202 comprising a twenty-first alternative embodiment of the present invention. The bellows 2202 is essentially identical to the bellows 2 shown in FIGS. 1 and 1a, except that the inner ply 2206 and the outer ply 2212 overlap at only a single corrugation identified at 2207 in FIG. 22a.

XXIV. Twenty-Second Alternative Embodiment Bellows 2302

FIGS. 23 and 23a show a bellows 2302 comprising a twenty-second alternative embodiment of the present invention. The bellows 2302 includes an outer ply 2312 with generally cylindrical end sections 2312a and 2312b and an intermediate corrugated bellows section located therebetween. An inner ply 2306 is located generally within one end of the outer ply 2312 and includes a single corrugation 2307 which closely matches the configuration of the corresponding outer ply corrugation. The inner ply terminates at an inner end 2306a located within the outer ply bellows section 2312 and an outer free end 2306b.

XXV. Twenty-Third Alternative Embodiment Bellows 2402

Figure 24A:
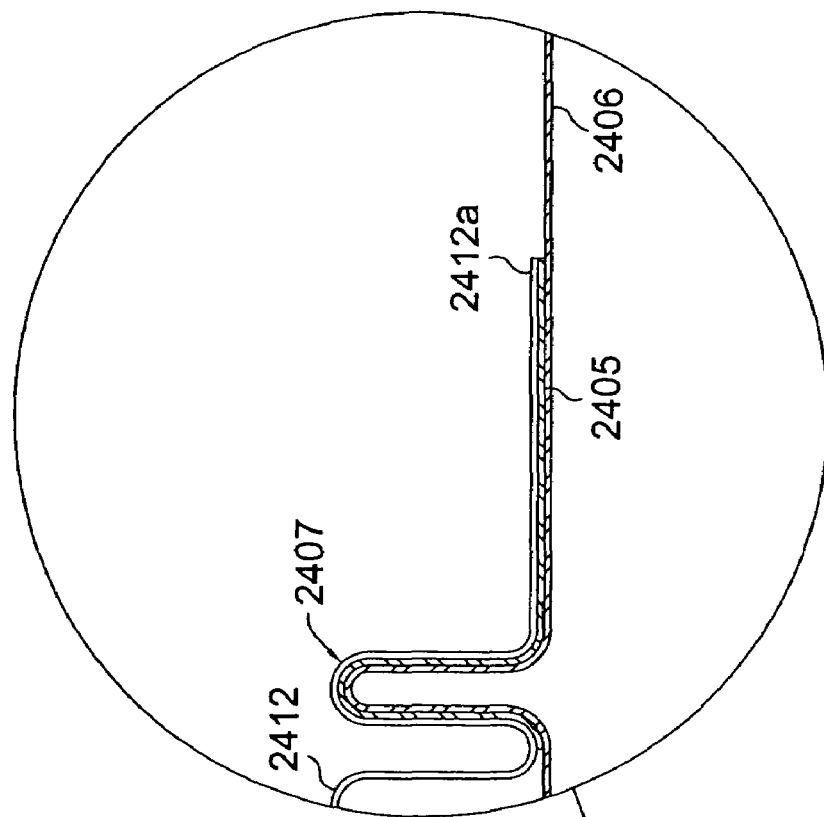
FIG. 24a is an enlarged, fragmentary, cross-sectional view thereof taken generally within Circle A in FIG. 24.
Figure 24:
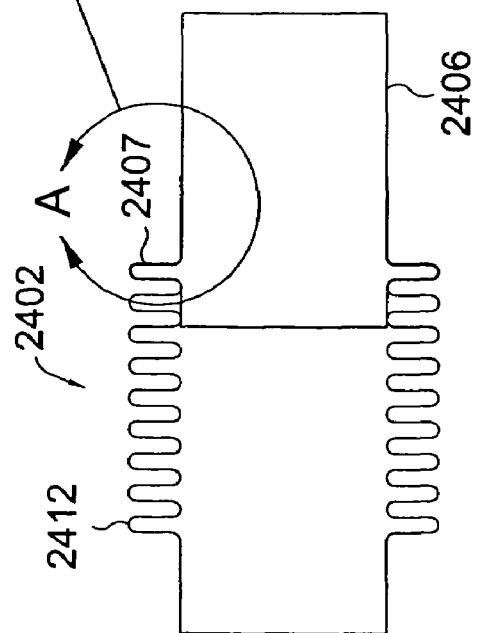
FIG. 24 is a longitudinal, cross-sectional view of an exhaust bellows comprising a twenty-third alternative embodiment of the present invention, with an intermediate liner layer.

FIGS. 24 and 24a show a bellows 2402 comprising a twenty-third alternative embodiment of the present invention. The bellows 2402 is similar to the bellows 2302 described above, with the addition of an intermediate ply 2405 comprising a layer of brass or some other suitable material located between the outer and inner plies, 2412 and 2406, respectively. The material of the intermediate ply 2405 is preferably chosen for inertness and lack of interaction with the materials (generally metal) comprising the outer and inner plies. The intermediate ply 2405 extends generally from a first end 2412a of the outer ply downstream to a location immediately downstream of the first corrugation 2407. The intermediate ply 2405 facilitates the "slip plane" effect by maintaining a relative low coefficient of friction between the outer and inner plies whereby the aforementioned torsional loads can effectively be resisted throughout the life of the bellows. The intermediate ply 2405 can extend for any desired length between the outer and inner plies, and can be adapted to any configuration thereof, including, but not limited to, the outer/inner ply configurations described herein. In the FIG. 24 embodiment, only a single corrugation 2407 overlaps between the inner and outer plies and the intermediate ply 2405.

XXVI. Twenty-Fourth Alternative Embodiment Bellows 2502

Figure 25:
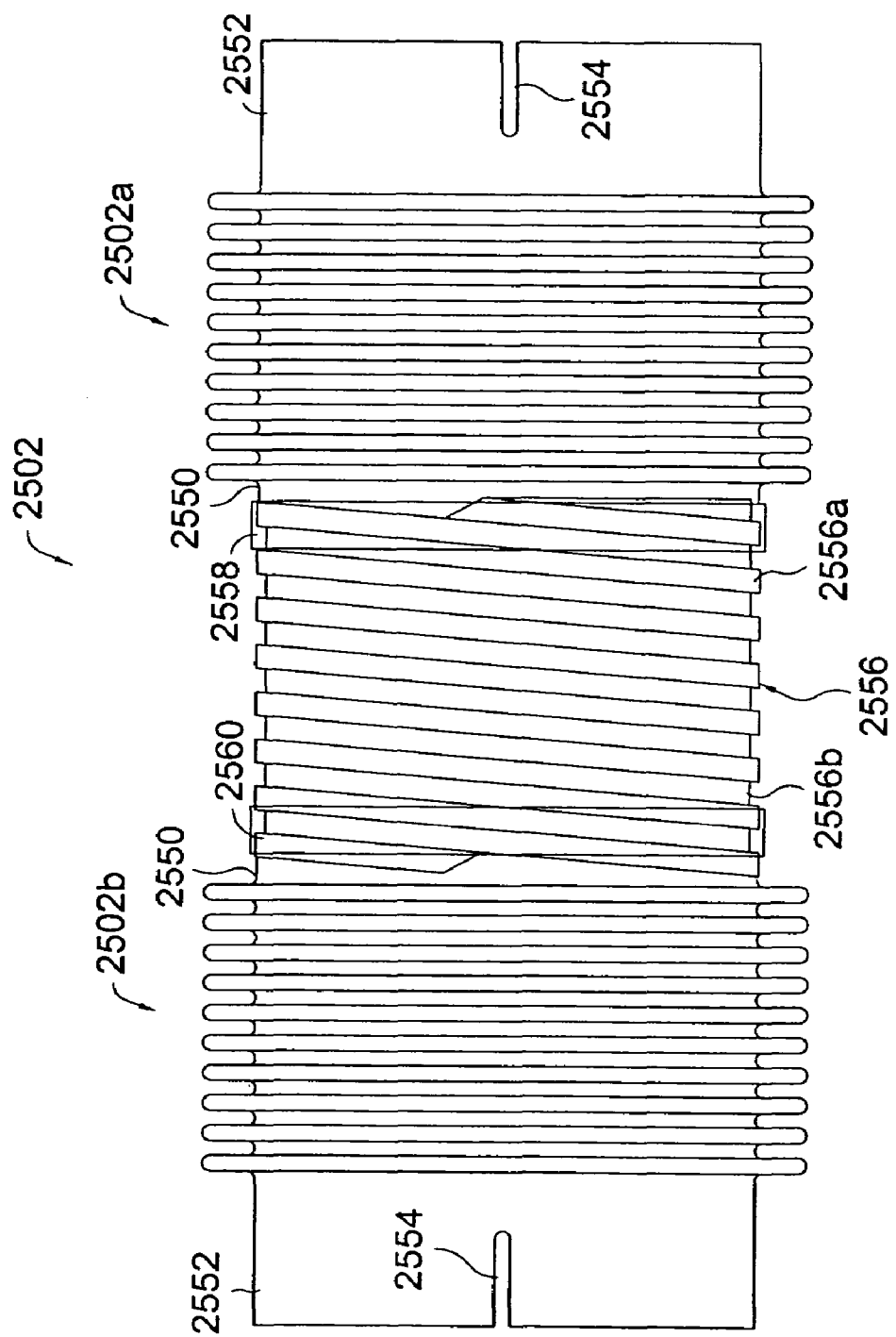
FIG. 25 is an elevational view of an exhaust bellows comprising a twenty-fourth alternative embodiment of the present invention, with an interlock located between two bellows sections.

FIG. 25 shows a bellows 2502 comprising a twenty-fourth alternative embodiment of the present invention. The bellows 2502 includes first and second bellows sections 2502a and 2502b each having inner and outer bellows section ends 2550 and 2552, respectively. The outer section bellows ends include four regularly-spaced slots 2554 which facilitate constricting the diameters of the bellows outer sections when mounting same on an exhaust system component.

An interlock 2556 comprising helical windings has first (upstream) and second (downstream) ends 2556a and 2556b, respectively, received in bellows section inboard ends 2550. First and second rings 2558 and 2560 are mounted in overlying relation over the bellows section ends 2550 and the interlocking section ends 2556a and 2556b. The rings 2558 and 2560 are secured in place by any suitable means, including clamping, adhesives and welding. For example, the rings can be seam welded, spot welded, TIG welded, etc.

XXVII. Twenty-Fifth Alternative Embodiment Bellows 2602

Figure 26:
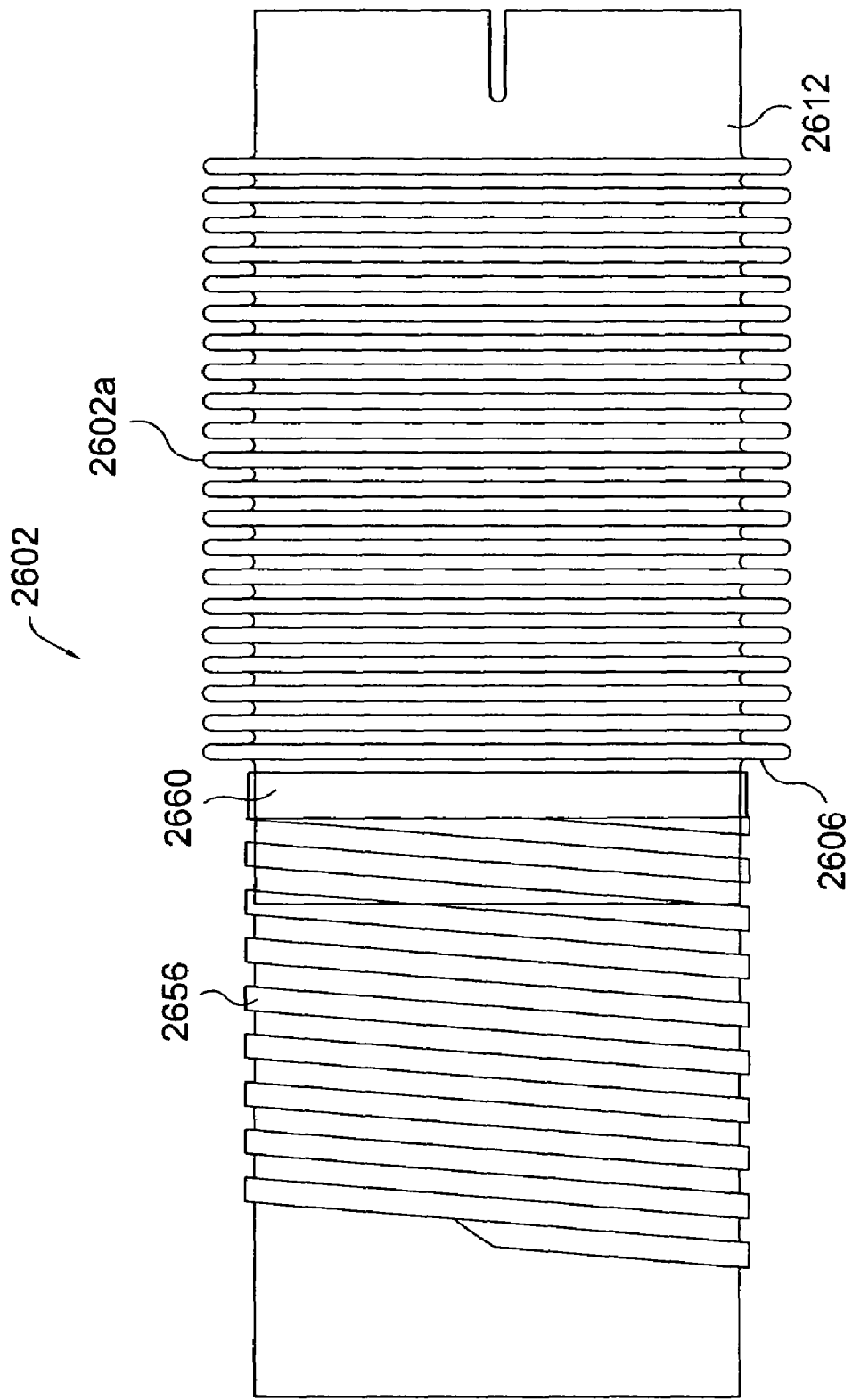
FIG. 26 is an elevational view of an exhaust bellows comprising a twenty-fifth alternative embodiment of the present invention having relatively lengthy bellows sections and an interlock on one end.

FIG. 26 shows a bellows 2602 comprising a twenty-fifth alternative embodiment of the invention. The bellows 2602 is similar to bellows 2502 except that bellows 2602 includes only a single bellows section 2602a which is relatively long and includes an inner ply 2606 and an interlocking yet relatively rotatable outer ply 2612. An interlock 2656 comprising spiral workings has its upstream end received in the downstream end of the bellows section 2602a. A ring 2660 is mounted to extend around the overlapping ends of section 2602a and the interlock 2656 and can be secured in place by any suitable means.

Preferably the construction of the multi-ply bellows facilitates slippage between the plies by forming a "slip plane" therebetween. The effectiveness of the slip plane can be enhanced by lowering the coefficient of friction between the plies, and by minimizing interactions between the materials over the course of time which would otherwise cause them to bond with each other. In addition to choice of ply materials, various lubricants can be applied between the plies to minimize frictional engagement therebetween. Such lubricants include graphite pastes, liquid lubricants, spray-on lubricants, Boron Nitride and Microblue lubricant.

In operation the hydroformed or mechanically formed inner ply facilitates a tight-fitting engagement with the outer ply for sealing and minimizing or eliminating leakage, with the seal between the inner and outer plies being maintained during relative rotation between them. Torsional loads between the exhaust system components are thereby resisted through the relative slippage between the plies. Moreover, the function of the bellows is to accommodate displacement between the exhaust system components particularly in the form of axial loads tending to expand and compress the bellows. Other loads include displacements along the axes of the exhaust system components, which can be accommodated by the bellows sections and by the slip planes. The end rings 1718 and 1720 add to the stiffness of the end sections of the construction.

Embodiments that include an extended liner result in a relatively smooth bore which has a number of advantages, including noise reduction and a reduction in static losses.

With reference now to FIGS. 27 and 27a, another alternative embodiment of the invention provides an exhaust bellows that is generally identified by numeral 1800. The bellows 1800 includes a first or upstream conduit section 1802 and a second or downstream conduit section 1804. Conduit section 1802 includes a cylindrical end portion 1806 which may be connected in a suitable manner with an upstream exhaust pipe (not shown). The conduit section 1802 further includes a body portion 1808 that includes a single relatively small corrugation 1810. Corrugation 1810 has a relatively small diameter.

The downstream conduit section 1804 includes a cylindrical end portion 1812 which may be suitably connected with a downstream pipe (not shown). Section 1804 has a body portion 1814 that includes a plurality of relatively large corrugations 1816 each having substantially the same diameter that is greater than the diameter of the single corrugation 1810 on conduit section 1802. The body portion of conduit section 1804 further includes a pair of relatively small end corrugations 1818 and 1820. Corrugations 1818 and 1820 have a relatively small diameter substantially equal to the diameter of corrugation 1810 and thus less than the diameter of corrugations 1816. The large corrugations 1816 are located between the small corrugations 1818 and 1820, with corrugation 1820 being located adjacent to the end portion 1812 and the other small corrugation 1818 being located near the opposite end of conduit section 1804.

When the exhaust bellows 1800 is assembled, the single corrugation 1810 on conduit section 1802 fits closely inside of and seals with corrugation 1818, as best shown in FIG. 27a. The fit of corrugation 1810 in corrugation 1818 allows the conduit sections 1802 and 1804 to rotate relative to one another while maintaining a seal between them due to the seal provided by the corrugations 1810 and 1818. The inner end of the body portion 1808 of conduit section 1802 terminates adjacent to the large corrugation 1816 that is adjacent to corrugation 1818.

Figures 28, 28A:
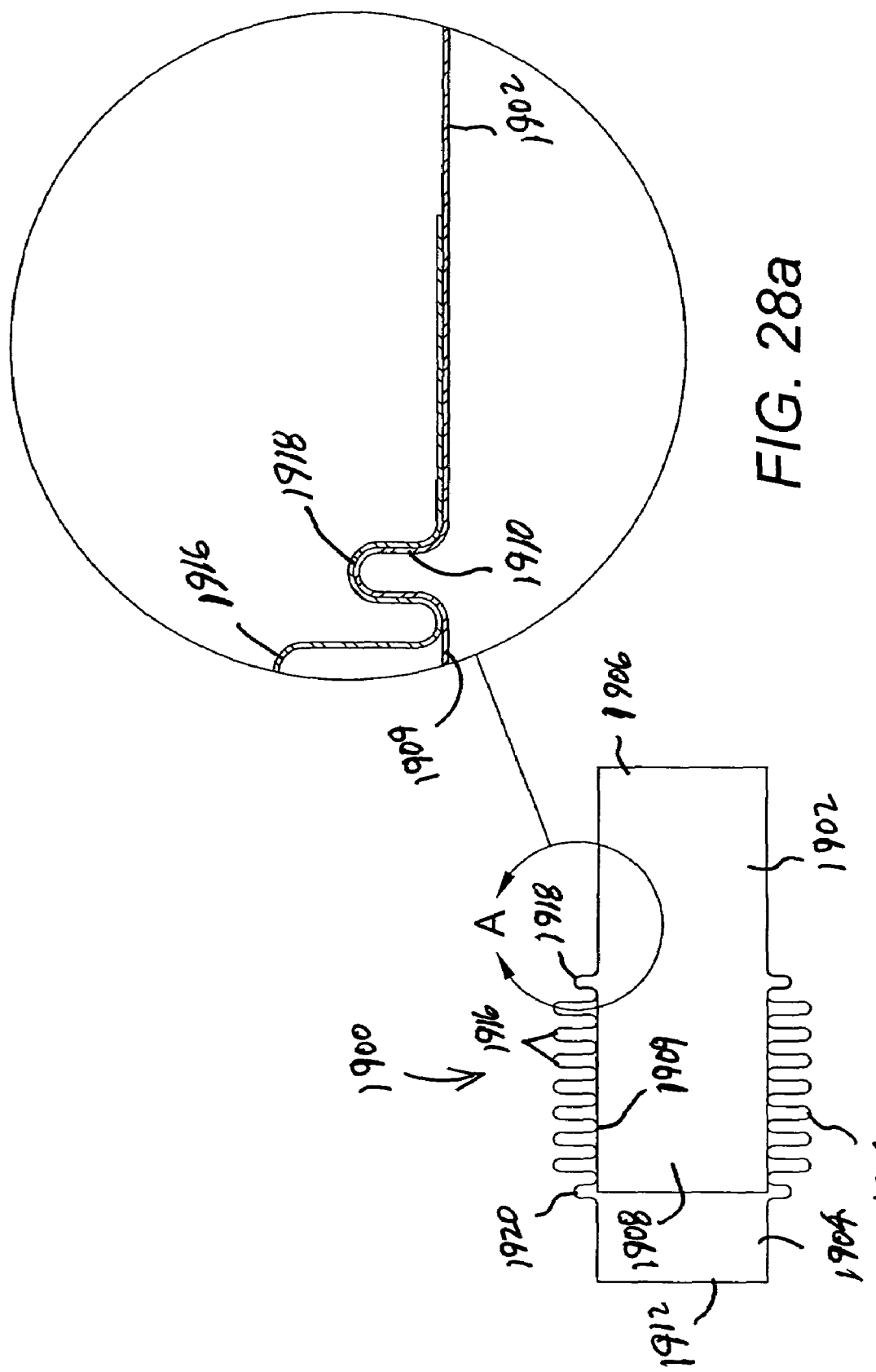
FIG. 28 is an elevational view of an exhaust bellows comprising an additional embodiment of the present invention, which is similar to the embodiment shown in FIG. 27 except that the bellows of FIG. 28 has a conduit section that extends inside of the corrugations of the other conduit section.
FIG. 28a is a fragmentary sectional view on an enlarged scale of the detail indicated by the letter A in FIG. 28.

FIGS. 28 and 28a depict an additional alternative exhaust bellows 1900 that is identical to the bellows 1800, except that the body portion 1908 of the upstream conduit section 1902 includes a cylindrical portion 1909 that extends inside of the body portion 1914 of downstream conduit section 1904 and extends inside of substantially all of the large corrugations 1916 as well as the two relatively small corrugations 1918 and 1920 on conduit section 1912. The single small corrugation 1910 fits closely inside of and seals with corrugation 1918 while allowing the conduit sections 1902 and 1904 to rotate relative to one another.

With reference to FIGS. 29 and 29a, another alternative exhaust bellows is generally identified by numeral 2000. The exhaust bellows 2000 includes an upstream conduit section 2002 and a downstream conduit section 2004. Section 2002 has an end portion 2006 and a body portion 2008 that presents a single intermediate size corrugation 2010 (see FIG. 29a in particular). The end portion 2006 may be suitably connected with an upstream exhaust pipe or other type of pipe (not shown).

The downstream conduit section 2004 includes an end portion 2012 that may be suitably connected with a downstream pipe (not shown). A body portion 2014 of conduit section 2004 includes a plurality of relatively large corrugations 2016 and a pair of relatively small corrugations 2018 and 2020. Corrugations 2016 have substantially the same diameter as one another and are larger in diameter than the intermediate corrugation 2010. The small corrugations 2018 and 2020 have substantially the same diameter as one another and are smaller in diameter than the intermediate corrugation 2010. The large corrugations 2016 are located between the small corrugations 2018 and 2020. The body portion of section 2004 includes an intermediate size corrugation 2021 which is located adjacent to the small corrugation 2018 and on a side of corrugation 2018 opposite the large corrugations 2016. Corrugation 2021 has a diameter substantially equal to but slightly larger than that of corrugation 2010.

As best shown in FIG. 29a, corrugation 2010 fits closely inside of corrugation 2021 when the exhaust bellows 2000 is assembled. The fit of corrugation 2010 in corrugation 2021 allows conduit sections 2002 and 2004 to rotate relative to one another. Corrugations 2010 and 2021 provide a seal which accommodates relative rotation of the conduit sections while providing a seal to prevent significant gas leakage.

FIGS. 30 and 30a depict another embodiment of an exhaust bellows which is generally identified by numeral 2100. Bellows 2100 is identical in all respects to bellows 2000, except that conduit section 2102 has a body portion 2108 that extends inside of the body portion 2114 of the downstream conduit section 2104. The body portion 2108 extends inside of all of the large corrugations 2116 and the small corrugations 2118 and 2120 and also inside of the intermediate corrugation 2121 (due to the fit of corrugation 2110 inside of corrugation 2121).

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A flexible conduit structure for connecting first and second pipes, comprising:
   a first conduit section having a body portion presenting a corrugation having a predetermined first diameter and an end portion for connection with said first pipe;
   a second conduit section having a body portion presenting a plurality of corrugations including at least one corrugation having a diameter substantially equal to said first diameter, said first and second conduit sections interfitting such that said corrugation of the first section mates with and seals with said one corrugation of the second section in a manner allowing relative rotation between said first and second conduit sections;
   an intermediate layer between said mating corrugations constructed from a material dissimilar from and not interactive with said mating corrugations;
   a coating of lubricant between said mating corrugations to reduce frictional engagement therebetween; and
   an end portion of said second conduit section for connection with said second pipe.

2. A flexible conduit structure as set forth in claim 1, wherein said one corrugation of said second section is an end corrugation located at one end of said plurality of corrugations.

3. A flexible conduit structure as set forth in claim 2, including a second end corrugation of said second section located at an end of said plurality of corrugations opposite said one end thereof, said second end corrugation having a diameter substantially equal to said first diameter.

4. A flexible conduit structure as set forth in claim 3, wherein said body portion of said first conduit section fits inside of said second conduit section and extends inside of substantially all of said plurality of corrugations on said second section.

5. A flexible conduit structure as set forth in claim 2, wherein said body portion of said first conduit section fits inside of said second conduit section and extends inside of substantially all of said plurality of corrugations on said second section.

6. A flexible conduit structure as set forth in claim 1, including a second small corrugation on said second conduit section having a diameter substantially equal to said one small corrugation and located such that said plurality of corrugations are between said one small corrugation and said second small corrugation.

7. A flexible conduit structure as set forth in claim 6, wherein said body portion of said first conduit section fits inside of said second conduit section and extends inside of substantially all of said plurality of corrugations on said second section.

8. A flexible conduit structure for connecting first and second pipes, comprising:
   a first conduit section having a body portion presenting a single small corrugation having a first diameter and an end portion for connection with said first pipe;
   a second conduit section having a body portion presenting a pair of small corrugations each having a diameter substantially equal to said first diameter and a plurality of large corrugations each having a diameter greater than said first diameter, said large corrugations being located between said pair of small corrugations;
   said first and second conduit sections interfitting such that said single small corrugation on said first section mates with one of said small corrugations in a manner to effect a seal therewith while allowing relative rotation between said first and second conduit sections;
   an intermediate layer between said mating corrugations constructed from a material dissimilar from and not interactive with said mating corrugations;
   a coating of lubricant between said mating corrugations to reduce frictional engagement therebetween; and
   an end portion of said second conduit section for connection with said second pipe.

9. A flexible conduit structure as set forth in claim 8, wherein said body portion of said first conduit section fits inside of said second conduit section and extends inside of substantially all of said large and small corrugations on said second section.

* * * * *